(12) United States Patent
Arai

(10) Patent No.: US 7,164,543 B2
(45) Date of Patent: Jan. 16, 2007

(54) ZOOM LENS SYSTEM

(75) Inventor: Daisaku Arai, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/235,174

(22) Filed: Sep. 27, 2005

(65) Prior Publication Data
US 2006/0066956 A1 Mar. 30, 2006

(30) Foreign Application Priority Data
Sep. 30, 2004 (JP) .............................. 2004-288855
Mar. 11, 2005 (JP) .............................. 2005-069652

(51) Int. Cl.
*G02B 15/14* (2006.01)

(52) U.S. Cl. ....................... 359/689; 359/680

(58) Field of Classification Search ........ 359/676–686, 359/689
See application file for complete search history.

(56) References Cited

U.S. PATENT DOCUMENTS

| 5,668,668 | A | * | 9/1997 | Shibayama et al. | ......... | 359/683 |
| 5,721,642 | A | * | 2/1998 | Shibayama et al. | ......... | 359/686 |
| 6,333,823 | B1 | | 12/2001 | Ozaki et al. | ................ | 359/690 |
| 6,771,432 | B1 | | 8/2004 | Mihara | ....................... | 359/687 |
| 6,850,279 | B1 | | 2/2005 | Scherling | ................... | 348/335 |
| 6,850,373 | B1 | | 2/2005 | Mihara et al. | .............. | 359/676 |
| 6,870,691 | B1 | | 3/2005 | Konno | ....................... | 359/738 |
| 6,975,462 | B1 | | 12/2005 | Mihara | ....................... | 359/687 |
| 6,995,922 | B1 | | 2/2006 | Mihara et al. | .............. | 359/689 |
| 2004/0141086 | A1 | | 7/2004 | Mihara | ....................... | 348/335 |

FOREIGN PATENT DOCUMENTS

| JP | 8-248318 A | 9/1996 |
| JP | 200-187160 A | 7/2000 |
| JP | 2002-341244 A | 11/2002 |
| JP | 2004-69808 A | 3/2004 |
| JP | 2004-219569 A | 8/2004 |
| JP | 2004-264343 A | 9/2004 |
| JP | 2004-333721 A | 11/2004 |

\* cited by examiner

*Primary Examiner*—Scott J. Sugarman
*Assistant Examiner*—M. Hasan
(74) *Attorney, Agent, or Firm*—Miles & Stockbridge PC

(57) ABSTRACT

An object is to provide an ultra-compact zoom lens system suitable for a video camera and a electronic still camera using a solid-state imaging device and the like with securing high optical performance. The zoom lens system includes, in order from an object along the optical axis, a first lens group having negative refractive power, a second lens group having positive refractive power, a third lens group having positive refractive power, and at least one lens group having positive refractive power. The first lens group is fixed upon zooming from a wide-angle end state to an telephoto end state and focusing. A plurality of lens groups except the first lens group are moved upon zooming from the wide-angle end state to the telephoto end state, respectively. A plurality of lens groups except the first lens group G1 are moved upon focusing, respectively. Given conditional expressions are satisfied.

18 Claims, 31 Drawing Sheets

FIG. 2
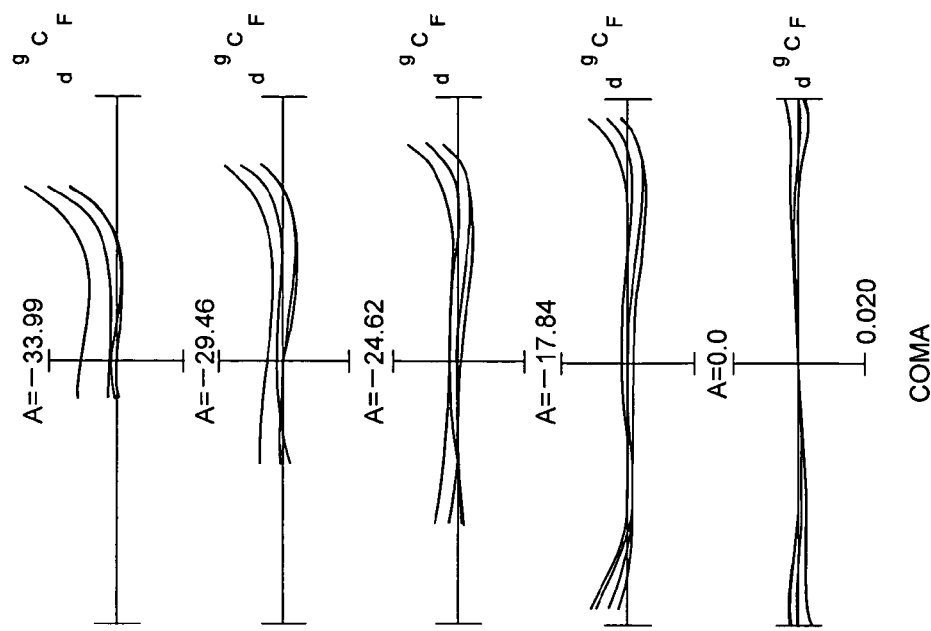
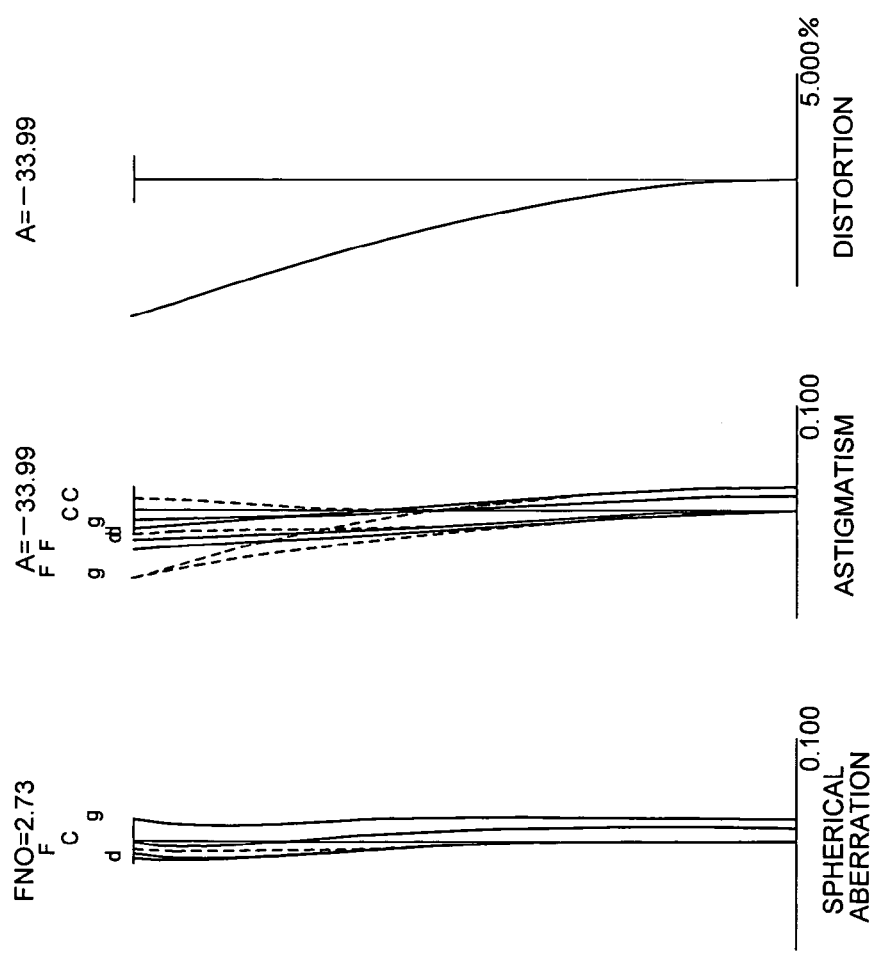

FIG. 3
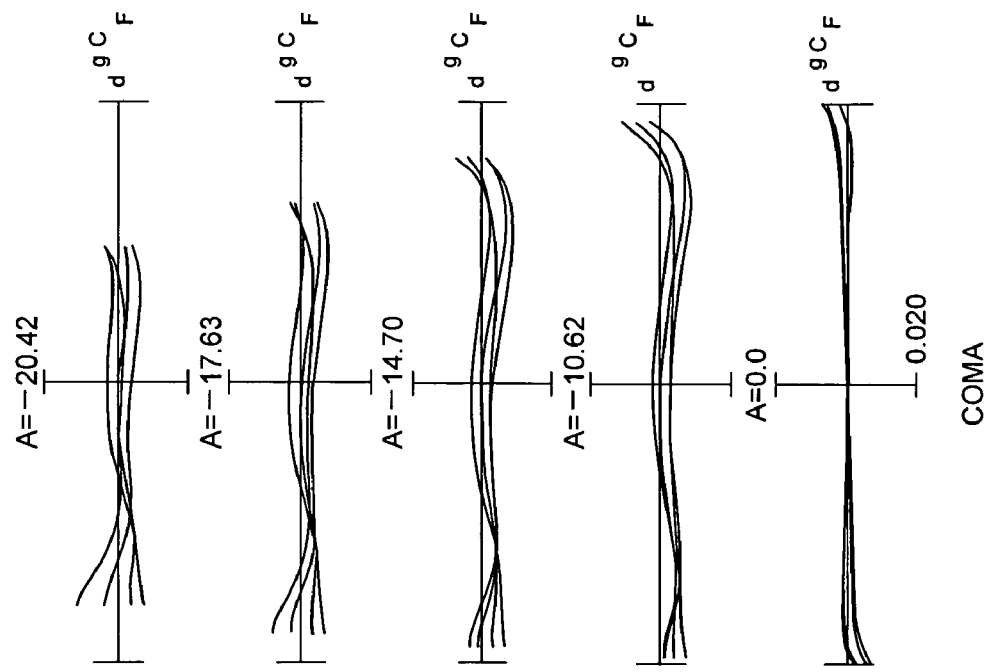
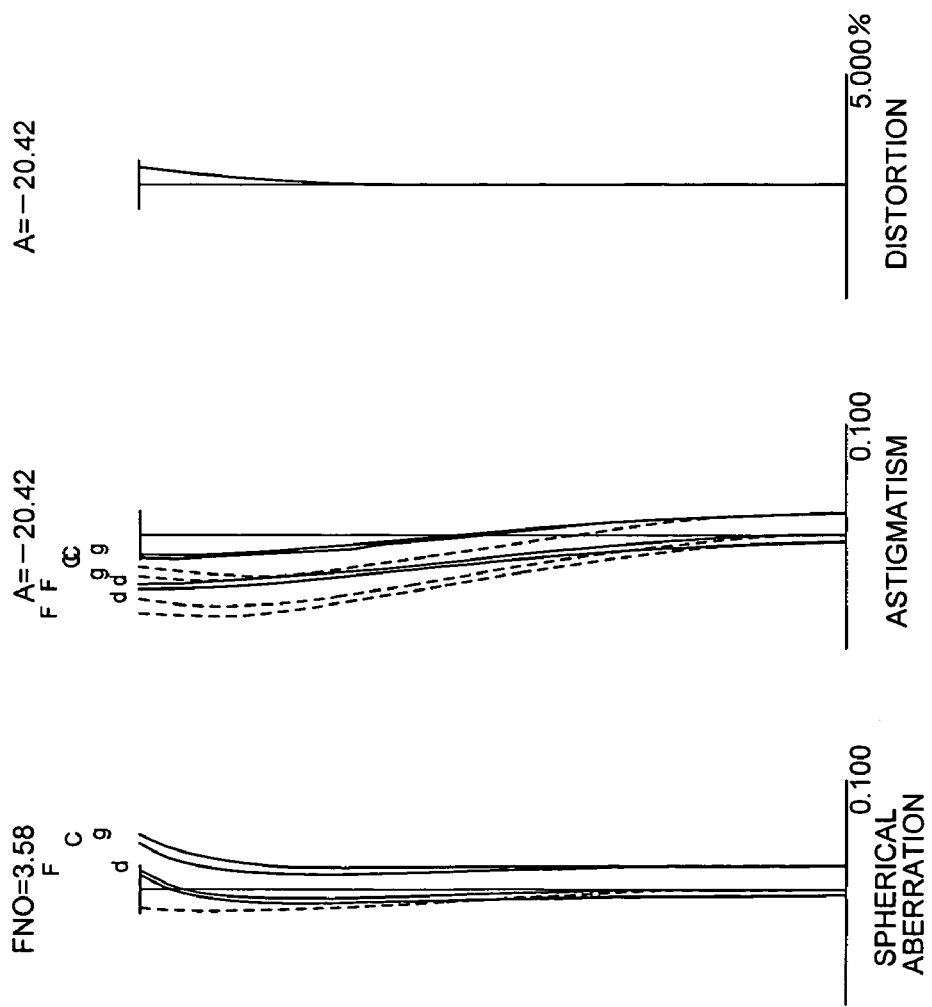

FIG. 6
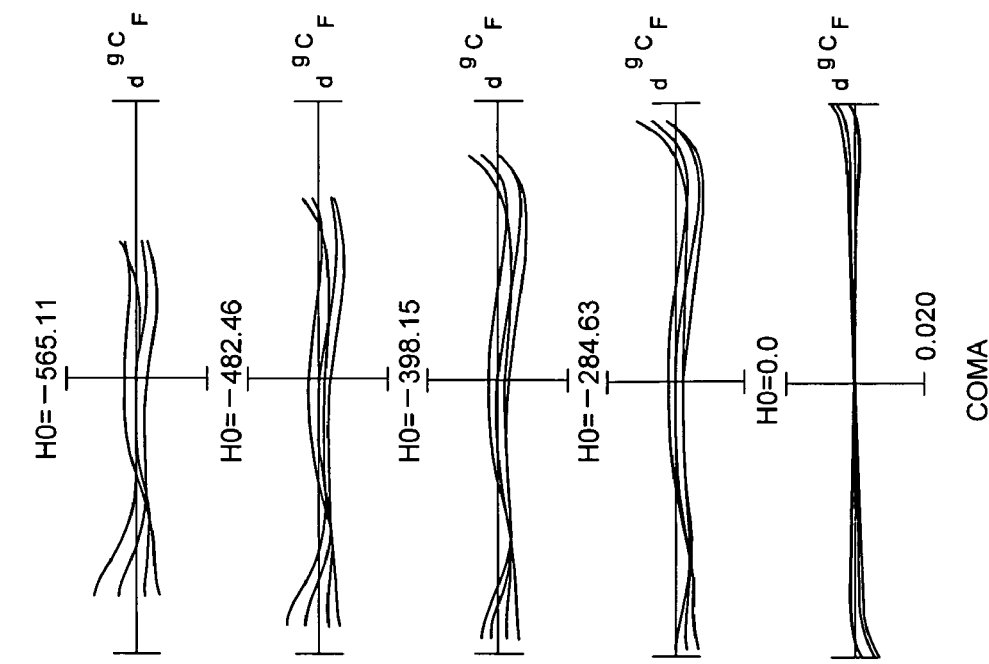
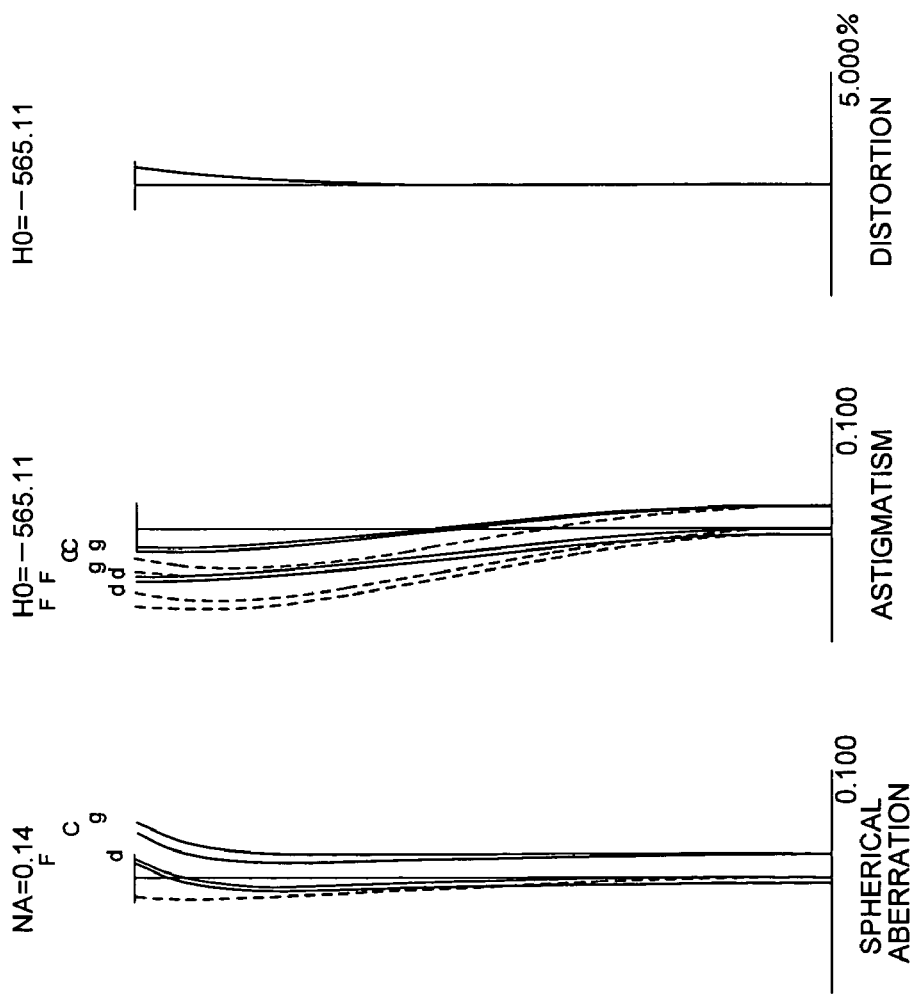

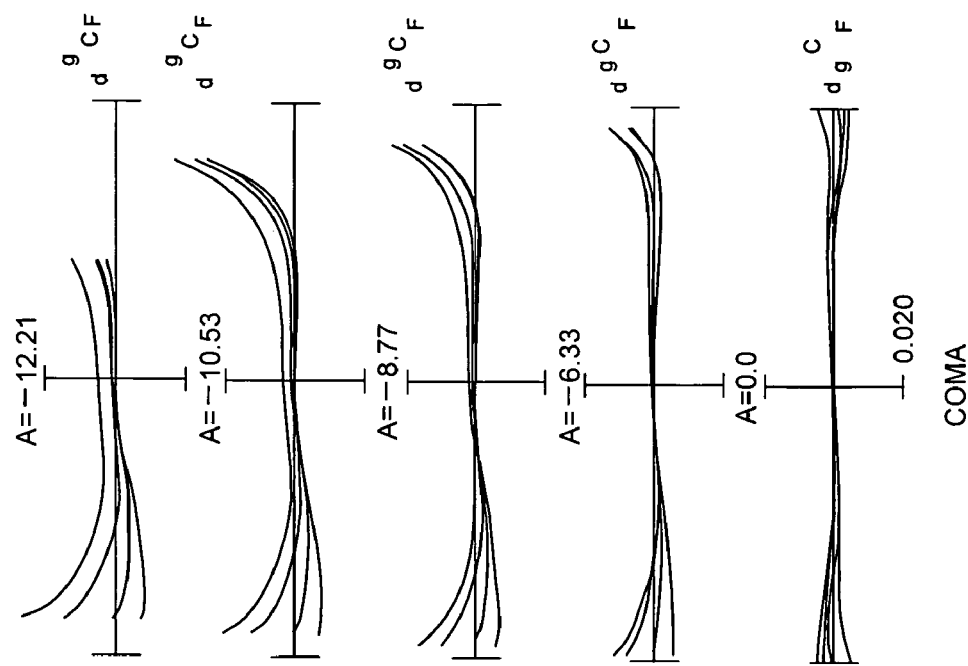
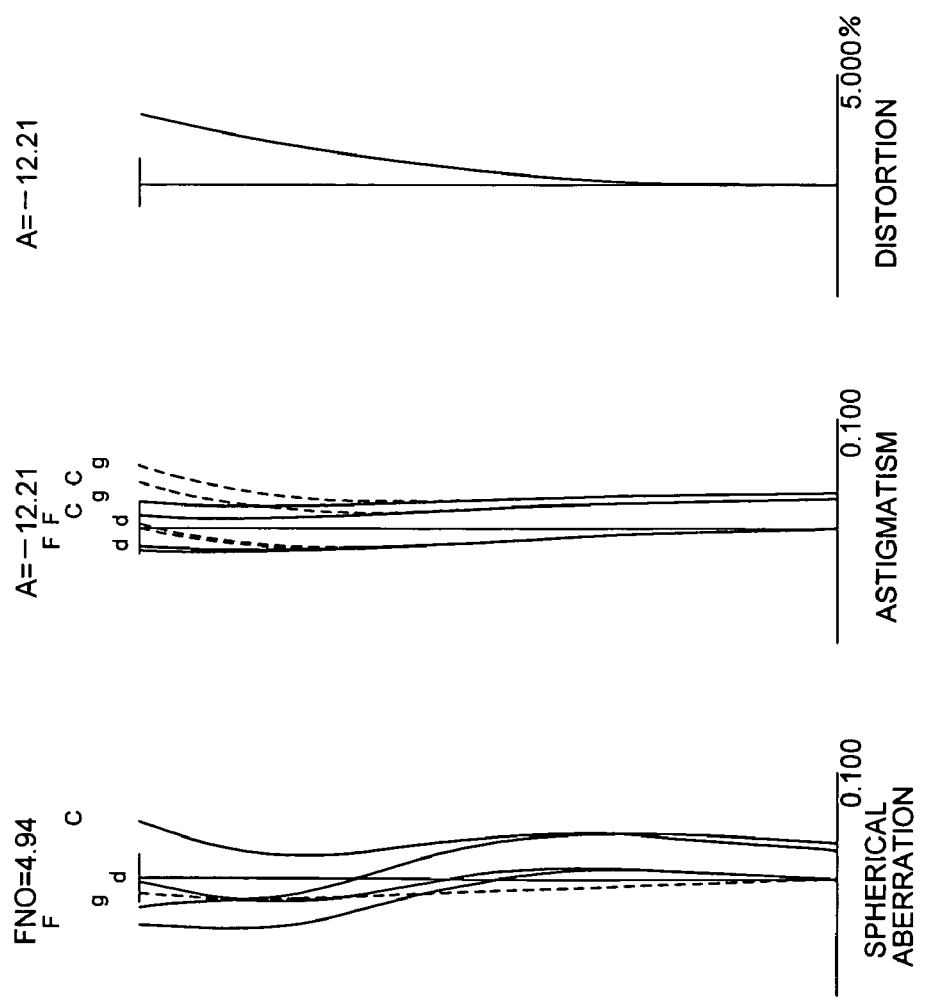
FIG. 11

FIG. 21
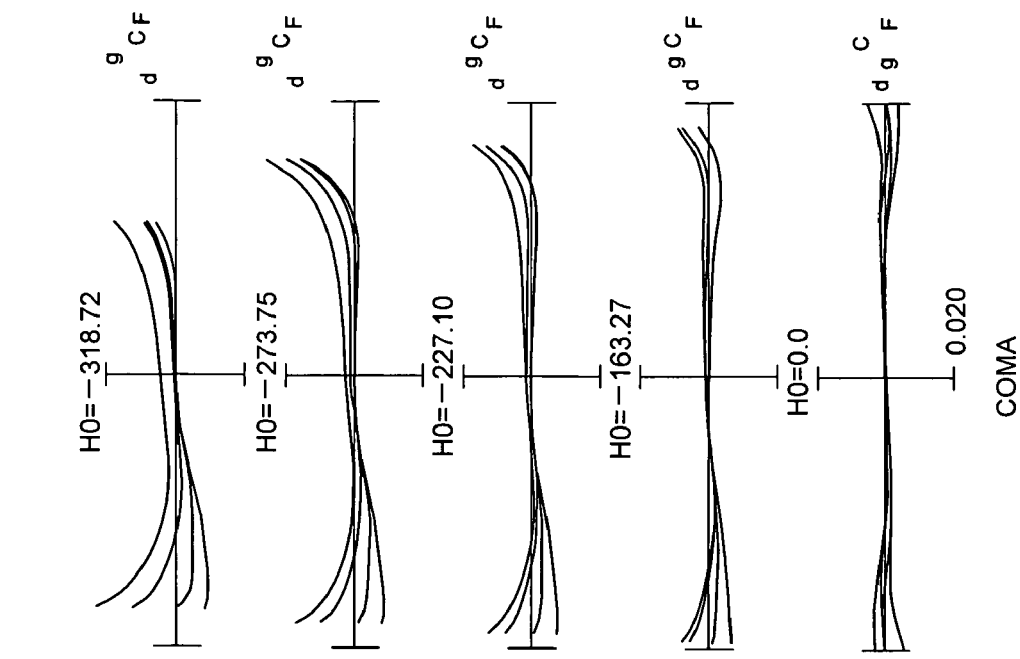
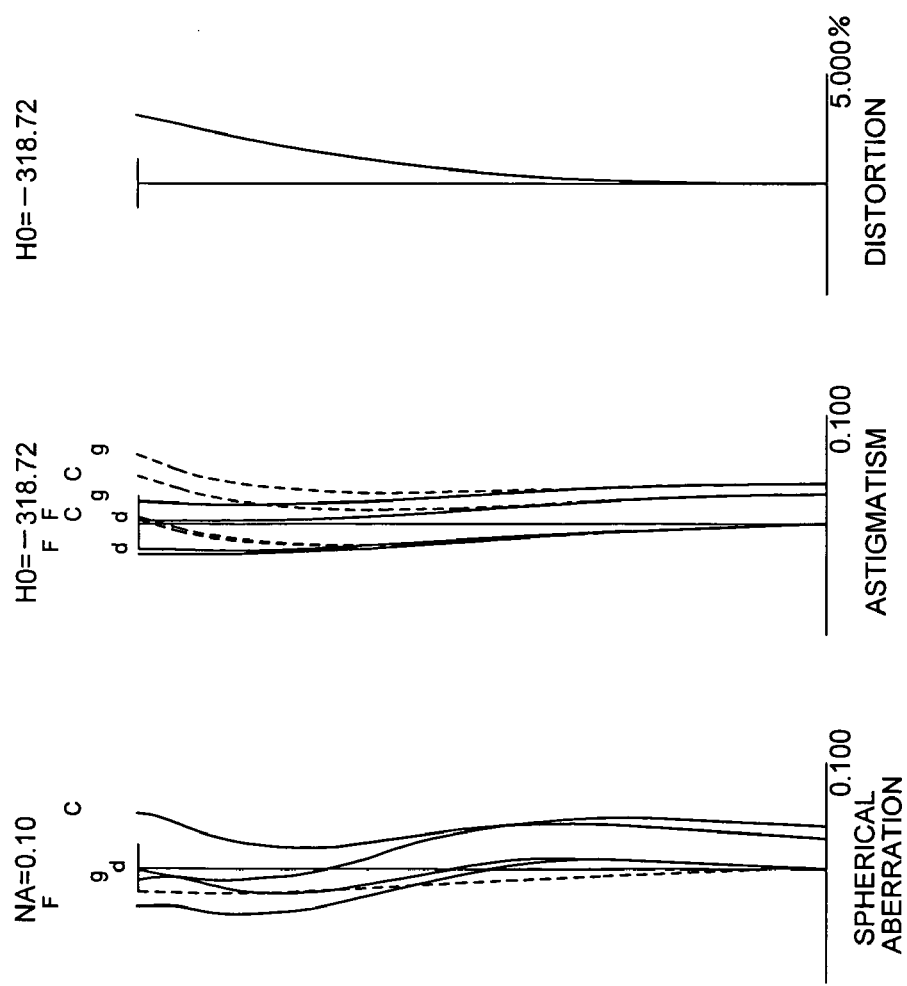

ZOOM LENS SYSTEM

The disclosures of the following priority applications are herein incorporated by reference:

Japanese Patent Application No. 2004-288855 filed on Sep. 30, 2004 and

Japanese Patent Application No. 2005-069652 filed on Mar. 11, 2005.

BACKGROUND OF THE INVENTION

1. Field of the Invention

The present invention relates to a zoom lens system suitable for a video camera and an electronic still camera using a solid-state imaging device and the like.

2. Related Background Art

A zoom lens system in which an optical-path-folding optics is included suitable for a solid-state imaging device has been proposed in Japanese Patent Application Laid-Open Nos. 8-248318, 2000-187160, 2002-341244, and 2004-069808.

However, in a zoom lens system disclosed in Japanese Patent Application Laid-Open No. 8-248318, since the first lens group is composed of lens elements having positive refractive power, the first lens group tends to become large.

Moreover, in a zoom lens system disclosed in Japanese Patent Application Laid-Open No. 2000-187160, in order to miniaturize the dimension of an optical-path-folding optics, the folding optics is disposed nearly at the center of the optical system. Accordingly, a plurality of lens elements are disposed to the object side of the folding optics, so that it becomes difficult to miniaturize the whole optical system.

Moreover, in a zoom lens system disclosed in Japanese Patent Application Laid-Open No. 2002-341244, in order to miniaturize the optical system, the first lens group is composed of lens elements having negative refractive power. However, since focusing is carried out by the third lens group having positive refractive power, the moving amount of the lens group becomes large upon focusing on a closest object, so that it becomes necessary to secure a large space. Accordingly, it becomes difficult to miniaturize the whole optical system.

Furthermore, in a zoom lens system disclosed in Japanese Patent Application Laid-Open No. 2004-069808, in order to miniaturize the optical system, since the position of the aperture stop is fixed upon zooming, the total lens length of the optical system becomes large. As a result, the height and the dimension of the camera becomes excessively large.

SUMMARY OF THE INVENTION

The present invention is made in view of the aforementioned problems and has an object to provide an ultra-compact zoom lens system suitable for a video camera and an electronic still camera using a solid-state imaging device and the like.

According to a first aspect of the present invention, a zoom lens system includes, in order from an object along an optical axis, a first lens group having negative refractive power, a second lens group having positive refractive power, a third lens group having positive refractive power, and at least one lens group having positive refractive power. The first lens group is always fixed upon zooming from a wide-angle end state to a telephoto end state and focusing. A plurality of lens groups except the first lens group are moved respectively upon zooming from the wide-angle end state to the telephoto end state. A plurality of lens groups except the first lens group are moved respectively upon focusing.

In one preferred embodiment of the present invention, the following conditional expression (1) is preferably satisfied:

$$0.05 < f2/f3 < 0.50 \qquad (1)$$

where f2 denotes the focal length of the second lens group and f3 denotes the focal length of the third lens group.

In one preferred embodiment of the present invention, an optical-path-folding optics is disposed in the first lens group and the following conditional expressions (2) and (3) are preferably satisfied:

$$1.70 < nd1 \qquad (2)$$

$$nd1 = nd2 \qquad (3)$$

where nd1 denotes refractive index of the optical-path-folding optics, and nd2 denotes refractive index of a lens element disposed to the object side of the optical-path-folding optics.

In one preferred embodiment of the present invention, the most image side lens group is preferably always fixed upon zooming from the wide-angle end state to the telephoto end state and focusing.

In one preferred embodiment of the present invention, an aperture stop is preferably disposed to the most object side of the second lens group and preferably moved together with the second lens group upon zooming.

In one preferred embodiment of the present invention, the first lens group preferably includes at least one aspherical surface.

In one preferred embodiment of the present invention, the second lens group preferably includes at least one aspherical surface.

In one preferred embodiment of the present invention, a plurality of lens groups moved upon zooming from the wide-angle end state to the telephoto end state are preferably the same lens groups moved upon focusing.

In one preferred embodiment of the present invention, a plurality of lens groups moved upon zooming from the wide-angle end state to the telephoto end state and focusing are preferably only the second lens group and the third lens group.

According to a second aspect of the present invention, a zoom lens system includes, in order from an object along an optical axis, a first lens group, and a plurality of lens groups. The first lens group is always fixed upon zooming from a wide-angle end state to a telephoto end state and focusing. The plurality of lens groups except the first lens group are moved respectively upon zooming from the wide-angle end state to the telephoto end state. The plurality of lens groups except the first lens group are moved respectively upon focusing.

According to a third aspect of the present invention, a zoom lens system includes, in order from an object along an optical axis, a first lens group having negative refractive power, a second lens group having positive refractive power, a third lens group having positive refractive power, and a fourth lens group having positive refractive power. The first lens group and the fourth lens group are always fixed upon zooming from a wide-angle end state to a telephoto end state and focusing. The second lens group and the third lens group are moved upon zooming from the wide-angle end state to the telephoto end state, respectively. The second lens group and the third lens group are moved upon focusing from infinity to a close object, respectively, such that the second lens group and the third lens group are moved in a body along the optical axis in the wide-angle end state and the telephoto end state, a moving direction of the second lens group and the third lens group in the wide-angle end state is opposite to that in the telephoto end state, and the second lens group and the third lens group are moved along the optical axis in the opposite directions with each other in the other focal length states. An optical-path-folding optics is included in the first lens group.

In one preferred embodiment of the present invention, the following conditional expressions (2) and (4) are preferably satisfied:

$$1.7 < nd1 \quad (2)$$

$$nd1 \leq nd2 \quad (4)$$

where nd1 denotes refractive index of the optical-path-folding optics, and nd2 denotes refractive index of a lens element disposed to the object side of the optical-path-folding optics.

In one preferred embodiment of the present invention, the second lens group is composed of, in order from the object, a single lens having positive refractive power, a cemented lens having negative refractive power, and a single lens having positive refractive power, and the following conditional expression (5) is preferably satisfied:

$$0.1 < f21/(-f22) < 1.0 \quad (5)$$

where f21 denotes the focal length of the most object side single lens having positive refractive power, and f22 denotes the focal length of the cemented lens.

In one preferred embodiment of the present invention, an aperture stop is preferably disposed to the most object side of the second lens group and moved together with the second lens group upon zooming.

In one preferred embodiment of the present invention, the most image side lens of the first lens group is preferably an aspherical lens.

In one preferred embodiment of the present invention, the most object side lens of the second lens group is preferably an aspherical lens.

Other features and advantages according to the invention will be readily understood from the detailed description of the preferred embodiment in conjunction with the accompanying drawings.

BRIEF DESCRIPTION OF THE DRAWINGS

FIG. 2 is graphs showing various aberrations of the zoom lens system according to Example 1 of the first embodiment of the present invention in the wide-angle end state upon focusing on infinity.

FIG. 3 is graphs showing various aberrations of the zoom lens system according to Example 1 of the first embodiment of the present invention in the intermediate focal length state upon focusing on infinity.

FIG. 6 is graphs showing various aberrations of the zoom lens system according to Example 1 of the first embodiment of the present invention in the intermediate focal length state upon focusing on a shooting distance of 1.5 m.

FIG. 11 is graphs showing various aberrations of the zoom lens system according to Example 2 of the first embodiment of the present invention in the telephoto end state upon focusing on infinity.

FIG. 21 is graphs showing various aberrations of the zoom lens system according to Example 3 of the first embodiment of the present invention in the telephoto end state upon focusing on a shooting distance of 1.5 m.

FIGS. 23A, 23B, and 23C are graphs showing various aberrations of the zoom lens system according to Example 4 of the second embodiment of the present invention upon focusing on infinity in which FIG. 23A shows the wide-angle end state, FIG. 23B shows the intermediate focal length state, and FIG. 23C shows the telephoto end state.

FIGS. 24A, 24B, and 24C are graphs showing various aberrations of the zoom lens system according to Example 4 of the second embodiment of the present invention upon focusing on a shooting distance of 1.5 m in which FIG. 24A shows the wide-angle end state, FIG. 24B shows the intermediate focal length state, and FIG. 24C shows the telephoto end state.

FIGS. 26A, 26B, and 26C are graphs showing various aberrations of the zoom lens system according to Example 5 of the second embodiment of the present invention upon focusing on infinity in which FIG. 26A shows the wide-angle end state, FIG. 26B shows the intermediate focal length state, and FIG. 26C shows the telephoto end state.

FIGS. 27A, 27B, and 27C are graphs showing various aberrations of the zoom lens system according to Example 5 of the second embodiment of the present invention upon focusing on a shooting distance of 1.5 m in which FIG. 27A shows the wide-angle end state, FIG. 27B shows the intermediate focal length state, and FIG. 27C shows the telephoto end state.

FIGS. 29A, 29B, and 29C are graphs showing various aberrations of the zoom lens system according to Example 6 of the second embodiment of the present invention upon focusing on infinity in which FIG. 29A shows the wide-angle end state, FIG. 29B shows the intermediate focal length state, and FIG. 29C shows the telephoto end state.

FIGS. 30A, 30B, and 30C are graphs showing various aberrations of the zoom lens system according to Example 6 of the second embodiment of the present invention upon focusing on a shooting distance of 1.5 m in which FIG. 30A shows the wide-angle end state, FIG. 30B shows the intermediate focal length state, and FIG. 30C shows the telephoto end state.

DESCRIPTION OF THE MOST PREFERRED EMBODIMENTS

First Embodiment

Figure 1:
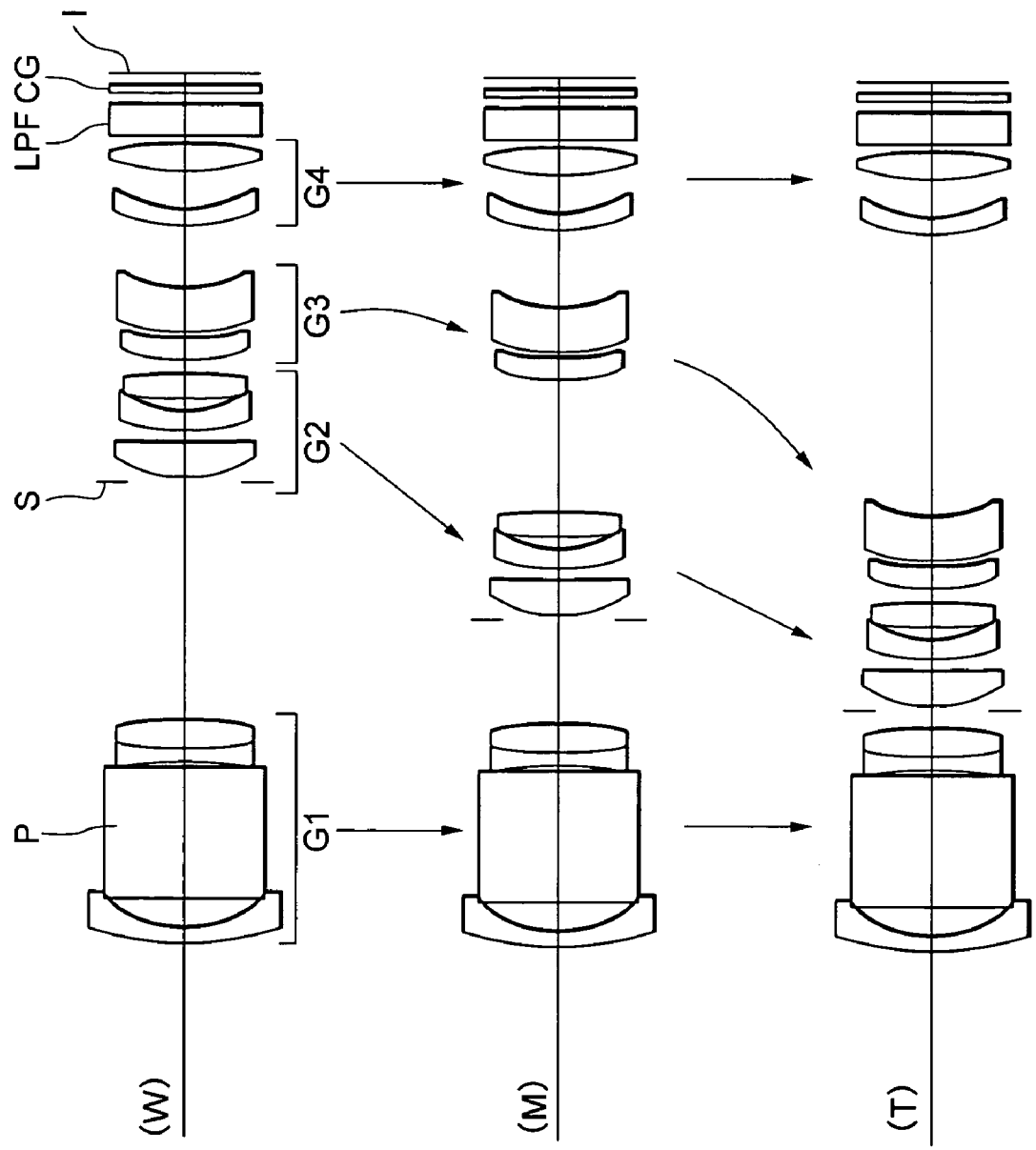
FIG. 1 is a diagram showing the lens arrangement of a zoom lens system according to Example 1 of a first embodiment of the present invention in which (W) shows a wide-angle end state, (M) shows an intermediate focal length state, and (T) shows a telephoto end state.

A zoom lens system according to a first embodiment of the present invention is explained below in detail.

A zoom lens system according to a first embodiment of the present invention includes, in order from an object along an optical axis, a first lens group having negative refractive power, a second lens group having positive refractive power, a third lens group having positive refractive power, and at least one lens group having positive refractive power. The first lens group is always fixed upon zooming from a wide-angle end state to a telephoto end state and upon focusing. Upon zooming from the wide-angle end state to the telephoto end state a plurality of lens groups except the first lens group are moved. Upon focusing a plurality of lens groups except the first lens group are moved.

In the zoom lens system according to the first embodiment of the present invention, since the first lens group, which is the largest lens group in the zoom lens system disposed to the most object side, is always fixed upon zooming from the wide-angle end state to the telephoto end state and upon focusing, the mechanical structure can be simple.

In the zoom lens system according to the first embodiment of the present invention, since zooming is carried out by a plurality of lens groups except the first lens group which is the largest lens group, a driver which is smaller than the previous one may be used.

In the zoom lens system according to the first embodiment of the present invention, since focusing is carried out by moving a plurality of lens groups except the first lens group, the driver for zooming and that for focusing may be the same one, so that the number of the drivers can be reduced.

In the zoom lens system according to the first embodiment of the present invention, by using a plurality of lens groups upon focusing, it becomes possible to keep superb optical performance upon changing a shooting distance. The moving amount of each lens group using for focusing can be kept small relative to the case where focusing is carried out by any one lens group, so that the total length of the zoom lens system can be small.

In the zoom lens system according to the first embodiment of the present invention, the following conditional expression (1) is preferably satisfied:

$$0.05 < f2/f3 < 0.50 \tag{1}$$

where f2 denotes the focal length of the second lens group, and f3 denotes the focal length of the third lens group.

Conditional expression (1) defines an appropriate range of the focal length of the second lens group and the third lens group. When the ratio f2/f3 is equal to or exceeds the upper limit of conditional expression (1), the total lens length of the zoom lens system becomes long, so that it is undesirable. On the other hand, when the ratio f2/f3 is equal to or falls below the lower limit of conditional expression (1), it becomes impossible to correct variation in aberration upon zooming resulting in deterioration of optical performance, so that it is undesirable. In order to secure the effect of the present invention, it is preferable to set the upper limit of conditional expression (1) to 0.30 and the lower limit to 0.08.

In the zoom lens system according to the first embodiment of the present invention, an optical-path-folding optics is disposed in the first lens group and the following conditional expressions (2) and (3) are preferably satisfied:

$$1.70 < nd1 \qquad (2)$$

$$nd1 = nd2 \qquad (3)$$

where nd1 denotes refractive index of the optical-path-folding optics, and nd2 denotes refractive index of the lens disposed to the object side of the optical-path-folding optics.

Conditional expression (2) defines an appropriate range of refractive index of the optical-path-folding optics. When the value nd1 is equal to or falls below the lower limit of conditional expression (2), the dimension of the folding optics becomes large and the zoom lens system as a whole becomes large, so that it is undesirable. In order to secure the effect of the present invention, it is preferable to set the lower limit of conditional expression (2) to 1.75 and it is further preferable to set the lower limit to 1.80.

In the zoom lens system according to the first embodiment of the present invention, it is preferable that the most image side lens group is always fixed upon zooming from the wide-angle end state to the telephoto end state and upon focusing. Accordingly, variation in aberration upon zooming and focusing can be suppressed. It becomes possible to hold the solid-state imaging device and the most image side lens group with a common member, so that it becomes easy to miniaturize the zoom lens system and manufacturing process can be simplified.

In the zoom lens system according to the first embodiment of the present invention, an aperture stop is disposed to the most object side of the second lens group and preferably moved together with the second lens group upon zooming. Accordingly, light amount adjustment can be carried out preferably.

The first lens group preferably includes at least one aspherical surface. Accordingly, distortion produced upon zooming in the wide-angle end state can be preferably corrected. In addition, the first lens group as a whole can be kept small.

The second lens group preferably includes at least one aspherical surface. Accordingly, spherical aberration and coma can be preferably corrected over entire zooming range.

In the zoom lens system according to the first embodiment of the present invention, a plurality of lens groups moving upon zooming from the wide-angle end state to the telephoto end state are preferably the same lens groups moving upon focusing.

It is preferable that the plurality of lens groups are only the second lens group and the third lens group. Accordingly, the driver for zooming and that for focusing may be the same one, so that the number of the drivers can be reduced.

Each example of the zoom lens system according to the first embodiment of the present invention is explained below with reference to accompanying drawings.

EXAMPLE 1

FIG. 1 is a diagram showing the lens arrangement of a zoom lens system according to Example 1 of a first embodiment of the present invention in which (W) shows a wide-angle end state, (M) shows an intermediate focal length state, and (T) shows a telephoto end state.

In FIG. 1, the zoom lens system according to Example 1 is composed of, in order from the object along the optical axis, a first lens group G1 having negative refractive power, a second lens group G2 having positive refractive power, a third lens group G3 having positive refractive power, and a fourth lens group G4 having positive refractive power. When a state of lens group positions varies from a wide-angle end state W to a telephoto end state T, the first lens group G1 is always fixed, the second lens group G2 and the third lens group G3 are moved, and the fourth lens group G4 is fixed such that a distance between the first lens group G1 and the second lens group G2 decreases, a distance between the second lens group G2 and the third lens group G3 varies. Upon focusing, the second lens group G2 and the third lens group G3 are moved at the same time. An aperture stop S is disposed to the most object side of the second lens group G2 and moved together with the second lens group G2. An optical low-pass filter LPF and a cover glass CG for a solid-state imaging device disposed on an image plane I are arranged between the fourth lens group G4 and the image plane I. Incidentally, a photographic film may be disposed on the image plane I instead of the imaging device. In this case, the cover glass CG is not necessary.

A prism P for folding the optical path by substantially 90 degrees is included in the first lens group G1. The prism P is shown as a plane parallel plate extending the optical path to a straight line. The folding angle of the optical path is not necessary to be 90 degrees and is changeable in accordance with design. A mirror may be used instead of the prism P.

Respective aspherical surfaces are applied to the most image side lens surface of the first lens group G1 and the most object side lens surface of the second lens group G2. In this manner, the zoom lens system according to Example 1 of the first embodiment is constructed.

Various values associated with Example 1 are shown in Table 1. In [Specifications], f denotes the focal length, Bf denotes a back focal length, FNO denotes an f-number, and ω denotes a half angle of view (unit: degrees). In [Lens Data], the first column shows the surface number that is a lens surface counted in order from the object, r denotes the radius of curvature of the lens surface, d denotes a distance between the lens surfaces, ν denotes Abbe number at d-line (λ=587.6 nm), and n denotes refractive index at d-line (λ=587.56 nm). By the way, r=0.0000 denotes a plane surface. Refractive index for the air=1.000000 is omitted. In [Aspherical Data], each aspherical coefficient is shown as the aspherical surface is expressed by the following expression:

$$X(y) = y^2/[r \cdot \{1 + (1 - \kappa y^2/r^2)^{1/2}\}] + C2 \cdot y^2 + C4 \cdot y^4 + C6 \cdot y^6 + C8 \cdot y^8 + C10 \cdot y^{10}$$

here $R = 1/((1/r) + 2 \times C2)$ where y denotes a height from the optical axis, X(y) denotes a distance along the optical axis from tangent lane at the vertex of the aspherical surface to the aspherical surface at the height y, r denotes a reference radius of curvature (R denotes a paraxial radius of curvature), κ denotes a conical coefficient, and Ci denote i-th order aspherical coefficient, respectively. An aspherical surface is denoted by an asterisk (*) attached to the surface number. In [Aspherical Data], "E-n" denotes "$10^{-n}$". In [Zooming Data], variable distances are shown in the wide-angle end state W, in the intermediate focal length state M, and in the telephoto end state T. In [Focusing Data], variable distances upon focusing on a shooting distance of 1.5 m are shown in the wide-angle end state W, in the intermediate focal length state M, and in the telephoto end state T. In [Values for Conditional Expressions], values corresponding to respective conditional expressions are shown.

In the tables for various values, "mm" is generally used for the unit of length such as the focal length, the radius of curvature, and the separation between optical surfaces. However, since an optical system proportionally enlarged or reduced its dimension can be obtained similar optical performance, the unit is not necessary to be limited to "mm" and any other suitable unit can be used. The explanation of reference symbols is the same in the other example.

TABLE 1

[Specifications]

|  | W | M | T |
|---|---|---|---|
| f = | 5.94310 | 10.00000 | 16.81000 |
| Bf = |  | 0.7632 (constant) |  |
| FNO = | 2.73157 | 3.58626 | 4.88832 |
| ω = | 33.99254° | 20.41852° | 12.25296° |

[Lens Data]

|  | r | d | ν | n |
|---|---|---|---|---|
| 1) | 18.0602 | 0.8000 | 40.76 | 1.882997 |
| 2) | 5.9822 | 1.6000 |  |  |
| 3) | 0.0000 | 7.5000 | 40.76 | 1.882997 |
| 4) | 0.0000 | 0.3000 |  |  |
| 5) | −25.6568 | 0.8000 | 40.76 | 1.882997 |
| 6) | 19.5373 | 1.6000 | 25.62 | 1.794910 |
| 7*) | −20.4288 | D1 |  |  |
| 8> | 0.0000 | 0.2000 | Aperture Stop S |  |
| 9*) | 6.4817 | 2.0000 | 61.25 | 1.589129 |
| 10) | −3792.6024 | 0.7000 |  |  |
| 11) | 12.0466 | 1.0000 | 23.78 | 1.846660 |
| 12) | 5.7330 | 0.8000 |  |  |
| 13) | 29.9788 | 1.3000 | 55.53 | 1.696797 |
| 14) | −36.0230 | D2 |  |  |
| 15) | 11.0078 | 1.3000 | 81.54 | 1.496999 |
| 16) | 25.5827 | 0.2000 |  |  |
| 17) | 9.6134 | 2.4000 | 23.78 | 1.846660 |
| 18) | 6.6500 | D3 |  |  |
| 19) | 11.1556 | 1.0000 | 40.76 | 1.882997 |
| 20) | 7.6371 | 2.0000 |  |  |
| 21) | 16.1406 | 1.6000 | 55.53 | 1.696797 |
| 22) | −25.8938 | 0.5000 |  |  |
| 23) | 0.0000 | 1.6600 | 64.14 | 1.516330 |
| 24) | 0.0000 | 0.5000 |  |  |
| 25) | 0.0000 | 0.5000 | 64.14 | 1.516330 |
| 26) | 0.0000 | Bf |  |  |

[Aspherical Data]

Surface Number 7

κ = 15.8396
C2 = 0.00000E+00
C4 = 5.99830E−05
C6 = 5.60780E−06
C8 = −2.65030E−07
C10 = 1.83730E−08

Surface Number 9

κ = 0.0901
C2 = 0.00000E+00
C4 = 8.46960E−05
C6 = 2.05470E−06
C8 = −4.26710E−08
C10 = 0.00000E+00

|  | W | M | T |
|---|---|---|---|

[Zooming Data]

| D1 | 13.42365 | 6.01622 | 0.99712 |
|---|---|---|---|
| D2 | 0.79704 | 7.29315 | 0.93803 |
| D3 | 3.55551 | 4.46682 | 15.84105 |

TABLE 1-continued

[Focusing Data]
shooting distance = 1.5 m

| D1 | 13.37695 | 6.13734 | 1.12999 |
|---|---|---|---|
| D2 | 0.79704 | 7.11147 | 0.93803 |
| D3 | 3.60221 | 4.52738 | 15.70818 |

[Values for Conditional Expressions]

f2/f3 = 0.106118
nd1 = 1.882997
nd2 = 1.882997

Figure 4:
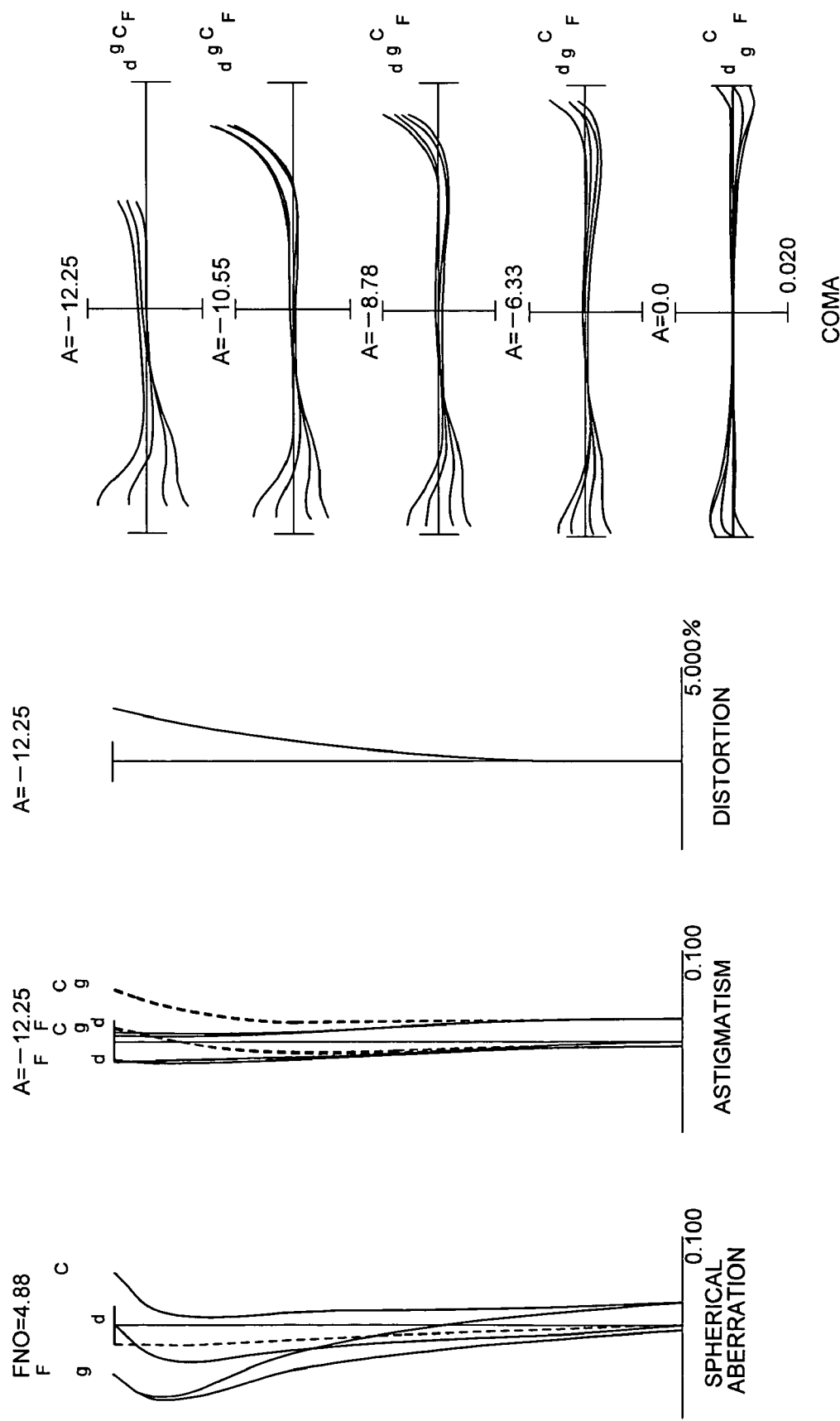
FIG. 4 is graphs showing various aberrations of the zoom lens system according to Example 1 of the first embodiment of the present invention in the telephoto end state upon focusing on infinity.
Figure 5:
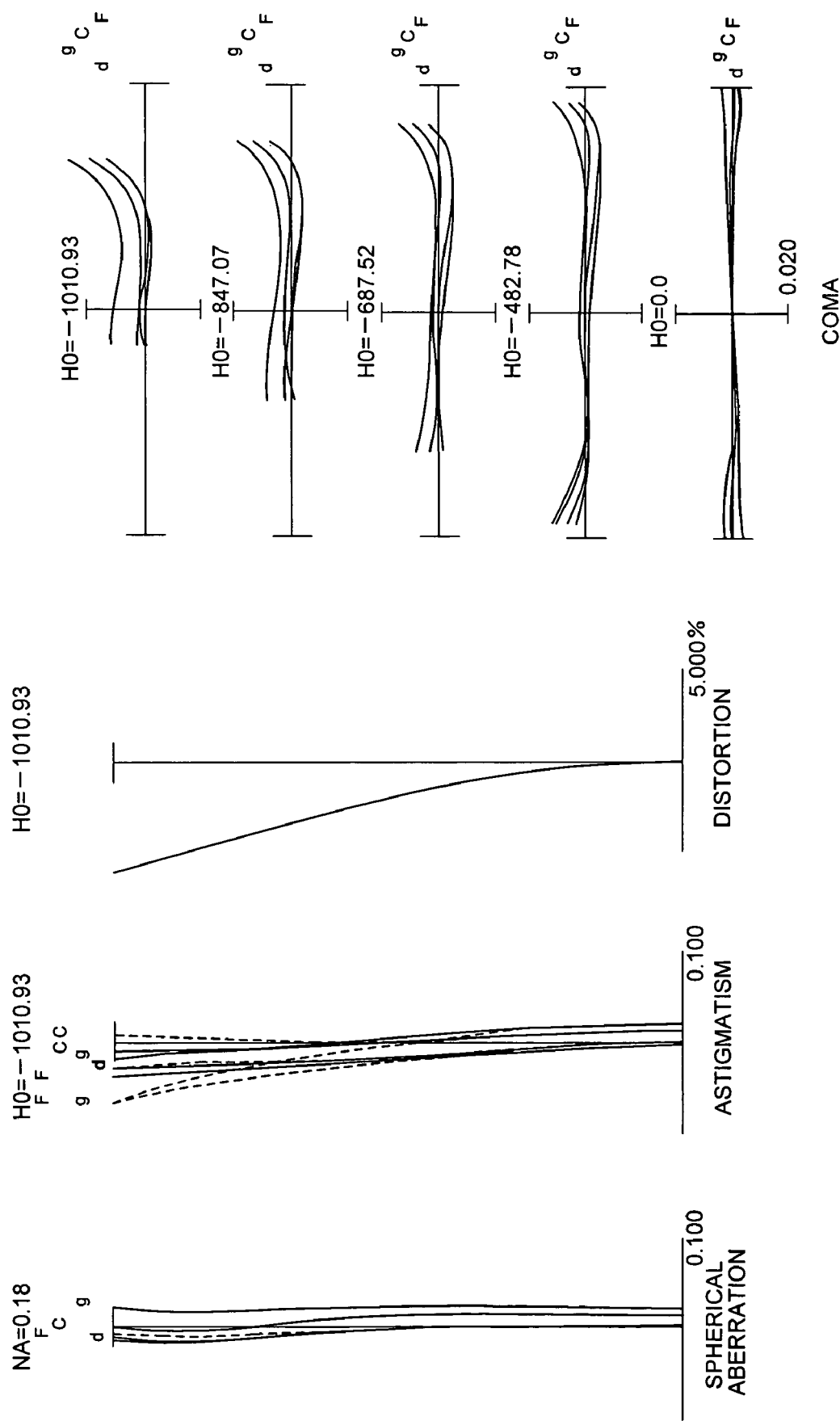
FIG. 5 is graphs showing various aberrations of the zoom lens system according to Example 1 of the first embodiment of the present invention in the wide-angle end state upon focusing on a shooting distance of 1.5 m.
Figure 7:
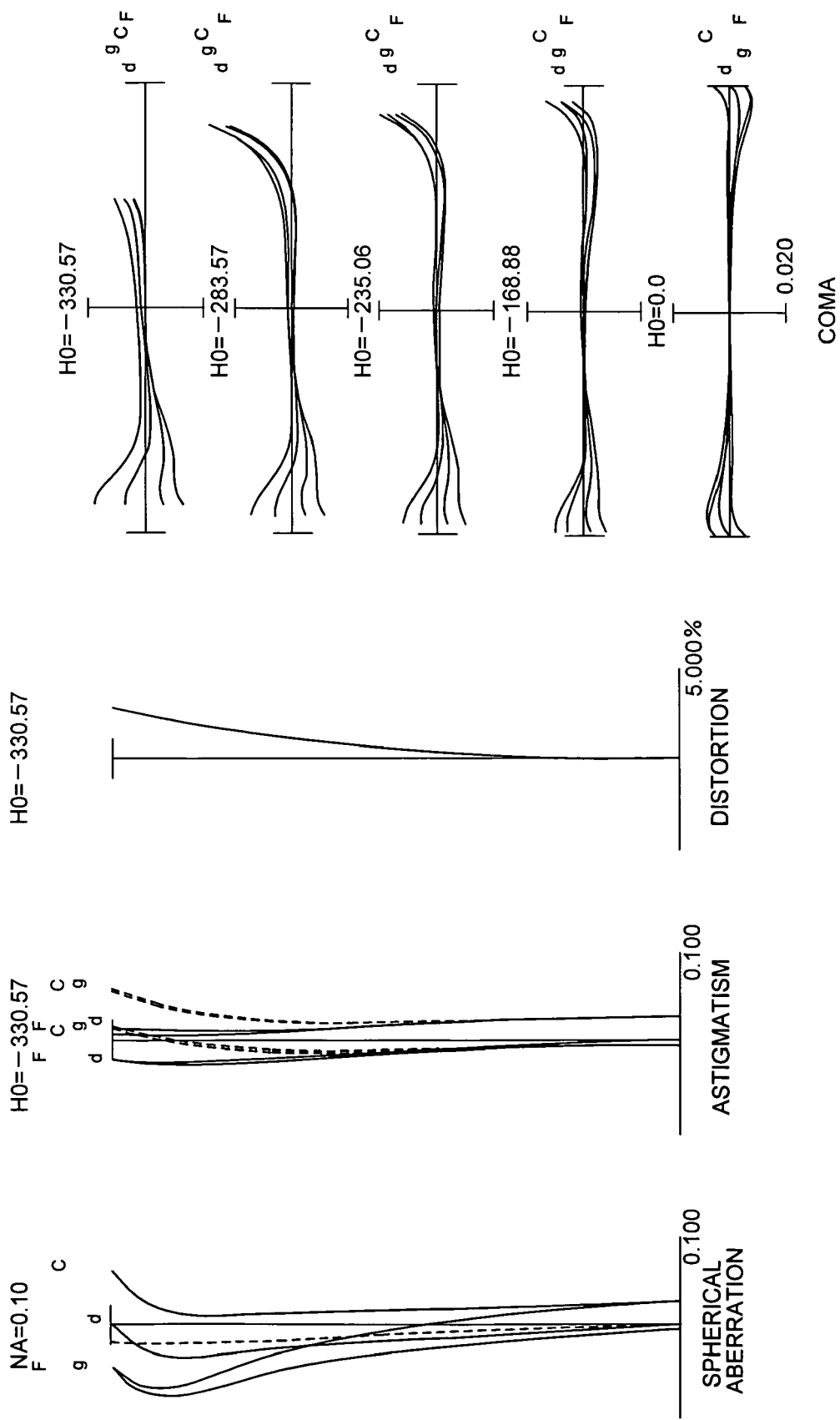
FIG. 7 is graphs showing various aberrations of the zoom lens system according to Example 1 of the first embodiment of the present invention in the telephoto end state upon focusing on a shooting distance of 1.5 m.

FIG. 2 is graphs showing various aberrations of the zoom lens system according to Example 1 of the first embodiment in the wide-angle end state upon focusing on infinity. FIG. 3 is graphs showing various aberrations of the zoom lens system according to Example 1 of the first embodiment in the intermediate focal length state upon focusing on infinity. FIG. 4 is graphs showing various aberrations of the zoom lens system according to Example 1 of the first embodiment in the telephoto end state upon focusing on infinity. FIG. 5 is graphs showing various aberrations of the zoom lens system according to Example 1 of the first embodiment in the wide-angle end state upon focusing on a shooting distance of 1.5 m. FIG. 6 is graphs showing various aberrations of the zoom lens system according to Example 1 of the first embodiment in the intermediate. focal length state upon focusing on a shooting distance of 1.5 m. FIG. 7 is graphs showing various aberrations of the zoom lens system according to Example 1 of the first embodiment in the telephoto end state upon focusing on a shooting distance of 1.5 m.

In respective graphs, FNO denotes an f-number, A denotes a half angle of view, NA denotes a numerical aperture, H0 denotes an object height, C denote aberration curve at C-line (λ=656.3 nm), d denotes aberration curve at d-line (587.6 nm), F denotes aberration curve at F-line (λ=486.1 nm), and g denotes aberration curve at g-line (λ=435.8 nm). In the graph showing astigmatism, a solid line indicates a sagittal image plane and a broken line indicates a meridional plane. The above-described explanation regarding various aberration graphs is the same as the other examples.

As is apparent from the respective graphs, the zoom lens system according to Example 1 shows superb optical performance as a result of good corrections to various aberrations in each focal length state from the wide-angle end state to the telephoto end state.

EXAMPLE 2

Figure 8:
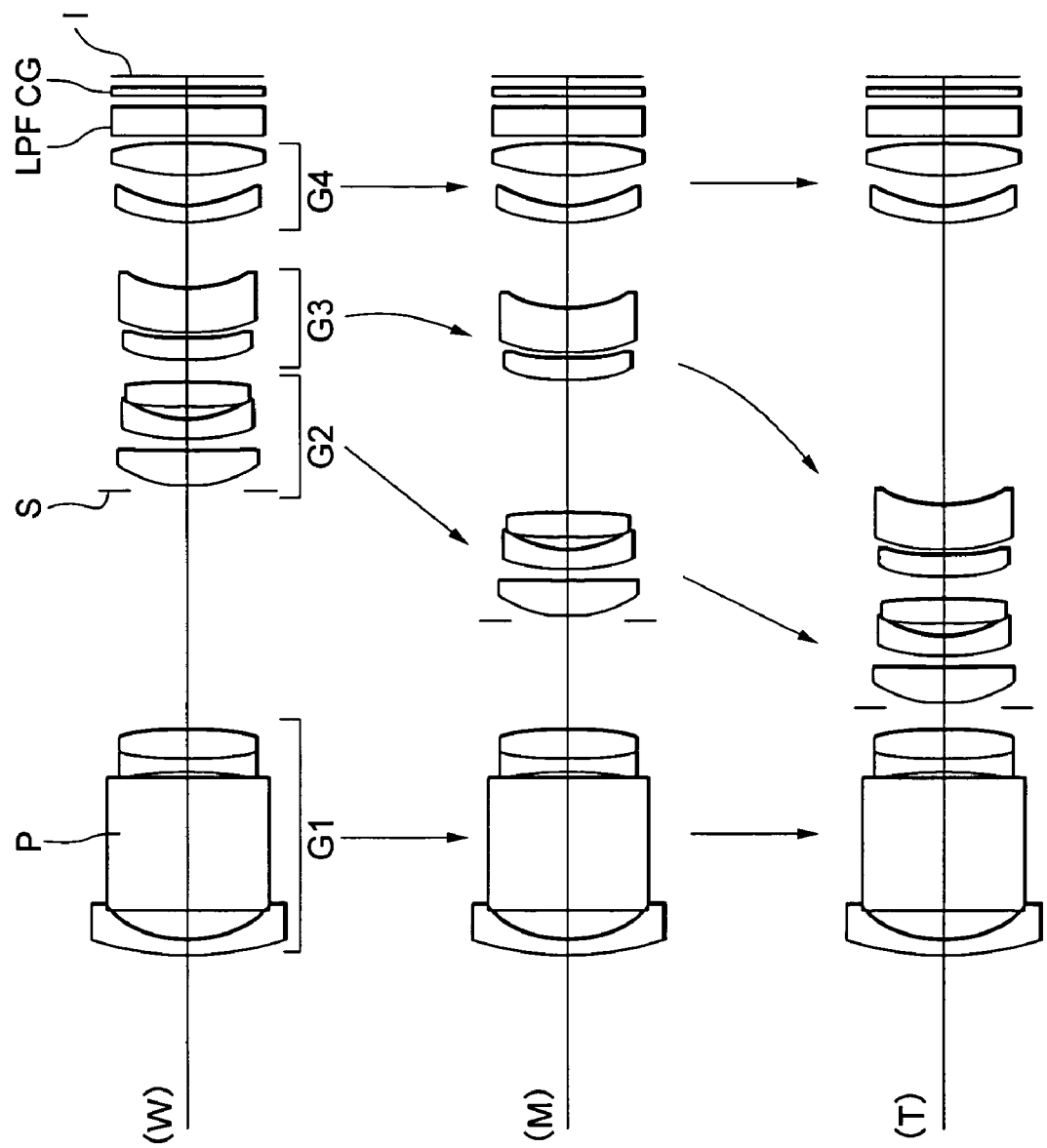
FIG. 8 is a diagram showing the lens arrangement of a zoom lens system according to Example 2 of the first embodiment of the present invention in which (W) shows the wide-angle end state, (M) shows the intermediate focal length state, and (T) shows the telephoto end state.

FIG. 8 is a diagram showing the lens arrangement of a zoom lens system according to Example 2 of the first embodiment of the present invention in which (W) shows the wide-angle end state, (M) shows the intermediate focal length state, and (T) shows the telephoto end state.

In FIG. 8, the zoom lens system according to Example 2 is composed of, in order from the object along the optical axis, a first lens group G1 having negative refractive power, a second lens group G2 having positive refractive power, a third lens group G3 having positive refractive power, and a fourth lens group G4 having positive refractive power. When a state of lens group positions varies from a wide-angle end state W to a telephoto end state T, the first lens group G1 is always fixed, the second lens group G2 and the third lens group G3 are moved, and the fourth lens group G4 is fixed such that a distance between the first lens group G1 and the second lens group G2 decreases, a distance between the second lens group G2 and the third lens group G3 varies. Upon focusing, the second lens group G2 and the third lens group G3 are moved at the same time. An aperture stop S is disposed to the most object side of the second lens group G2 and moved together with the second lens group G2. An optical low-pass filter LPF and a cover glass CG for a solid-state imaging device disposed on an image plane I are arranged between the fourth lens group G4 and the image plane I. Incidentally, a photographic film may be disposed on the image plane I instead of the imaging device. In this case, the cover glass CG is not necessary.

A prism P for folding the optical path by substantially 90 degrees is included in the first lens group G1. The prism P is shown as a plane parallel plate extending the optical path to a straight line. The folding angle of the optical path is not necessary to be 90 degrees and is changeable in accordance with design. A mirror may be used instead of the prism P.

Respective aspherical surfaces are applied to the most image side lens surface of the first lens group G1 and the most object side lens surface of the second lens group G2. In this manner, the zoom lens system according to Example 2 of the first embodiment is constructed.

Various values associated with Example 2 are shown in Table 2.

TABLE 2

[Specifications]

|  | W | M | T |
|---|---|---|---|
| f = | 5.94310 | 10.00000 | 16.81000 |
| Bf = | | 0.60629 (constant) | |
| FNO = | 2.77502 | 3.63789 | 4.94498 |
| ω = | 33.99081° | 20.39508° | 12.21346° |

[Lens Data]

| | r | d | ν | n |
|---|---|---|---|---|
| 1) | 18.2386 | 0.8000 | 40.76 | 1.882997 |
| 2) | 5.9551 | 1.6000 | | |
| 3) | 0.0000 | 7.5000 | 40.76 | 1.882997 |
| 4) | 0.0000 | 0.3000 | | |
| 5) | −31.3479 | 0.8000 | 40.76 | 1.882997 |
| 6) | 16.1389 | 1.6000 | 25.62 | 1.794910 |
| 7*) | −24.1994 | D1 | | |
| 8> | 0.0000 | 0.2000 | Aperture Stop S | |
| 9*) | 6.2196 | 1.9000 | 61.25 | 1.589129 |
| 10) | 165.2149 | 0.6000 | | |
| 11) | 11.7521 | 1.1000 | 23.78 | 1.846660 |
| 12) | 5.5828 | 0.9000 | | |
| 13) | 40.2427 | 1.3000 | 55.53 | 1.696797 |
| 14) | −24.8864 | D2 | | |
| 15) | 11.1489 | 1.3000 | 81.54 | 1.496999 |
| 16) | 25.9685 | 0.2000 | | |
| 17) | 9.9685 | 2.5000 | 23.78 | 1.846660 |
| 18) | 6.9094 | D3 | | |
| 19) | 11.8715 | 0.8000 | 40.76 | 1.882997 |
| 20) | 7.4982 | 1.8000 | | |
| 21) | 15.5832 | 1.7000 | 55.53 | 1.696797 |
| 22) | −23.5742 | 0.5000 | | |
| 23) | 0.0000 | 1.6600 | 64.14 | 1.516330 |
| 24) | 0.0000 | 0.5000 | | |
| 25) | 0.0000 | 0.5000 | 64.14 | 1.516330 |
| 26) | 0.0000 | Bf | | |

[Aspherical Data]

Surface Number 7

κ = 2.1743
C2 = 0.00000E+00
C4 = −1.32490E−04

TABLE 2-continued

C6 = −4.76650E−06
C8 = 2.92090E−07
C10 = −1.11270E−08

Surface Number 9

κ = 0.6664
C2 = 0.00000E+00
C4 = −1.87700E−04
C6 = −1.39500E−06
C8 = −3.03040E−08
C10 = 0.00000E+00

|  | W | M | T |
|---|---|---|---|
| | [Zooming Data] | | |
| D1 | 13.36848 | 6.13267 | 1.20000 |
| D2 | 1.20001 | 7.37871 | 1.20001 |
| D3 | 3.77787 | 4.83497 | 15.94635 |
| | [Focusing Data] shooting distance = 1.5 m | | |
| D1 | 13.32384 | 6.21664 | 1.32543 |
| D2 | 1.20001 | 7.21077 | 1.20001 |
| D3 | 3.82251 | 4.91894 | 15.82092 |

[Values for Conditional Expressions]

f2/f3 = 0.114998
nd1 = 1.882997
nd2 = 1.882997

Figure 9:
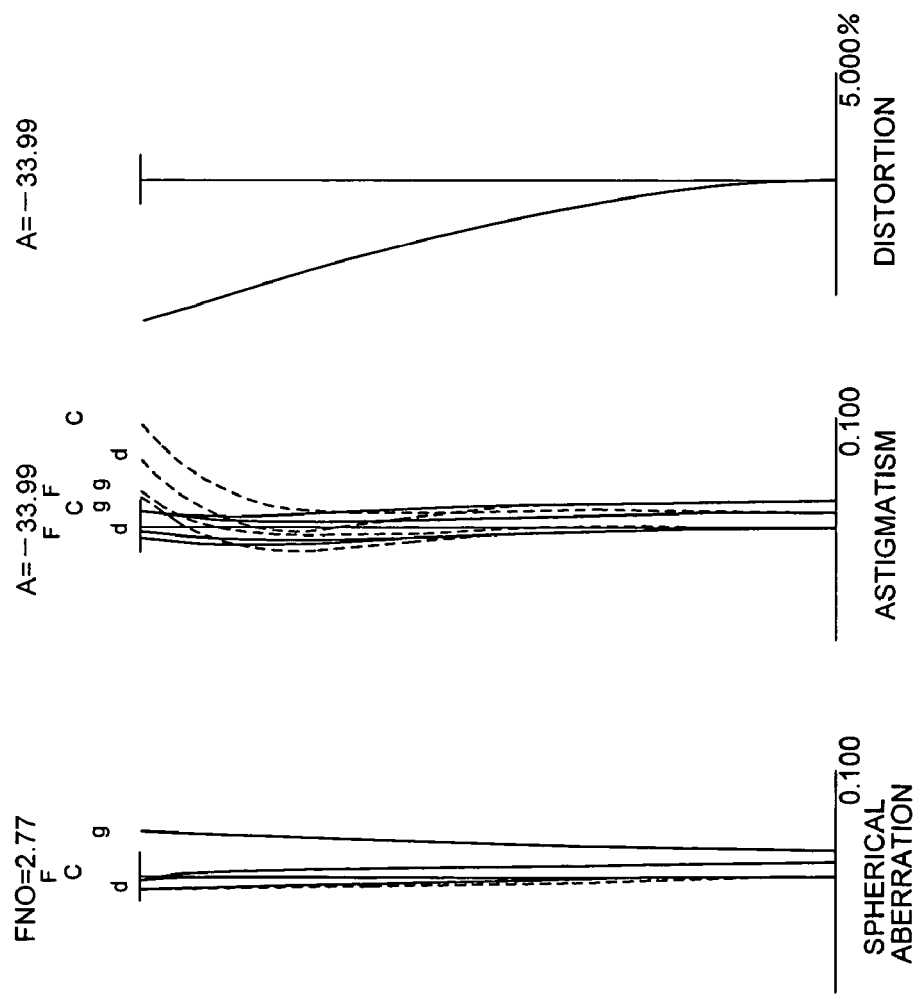
FIG. 9 is graphs showing various aberrations of the zoom lens system according to Example 2 of the first embodiment of the present invention in the wide-angle end state upon focusing on infinity.
Figure 10:
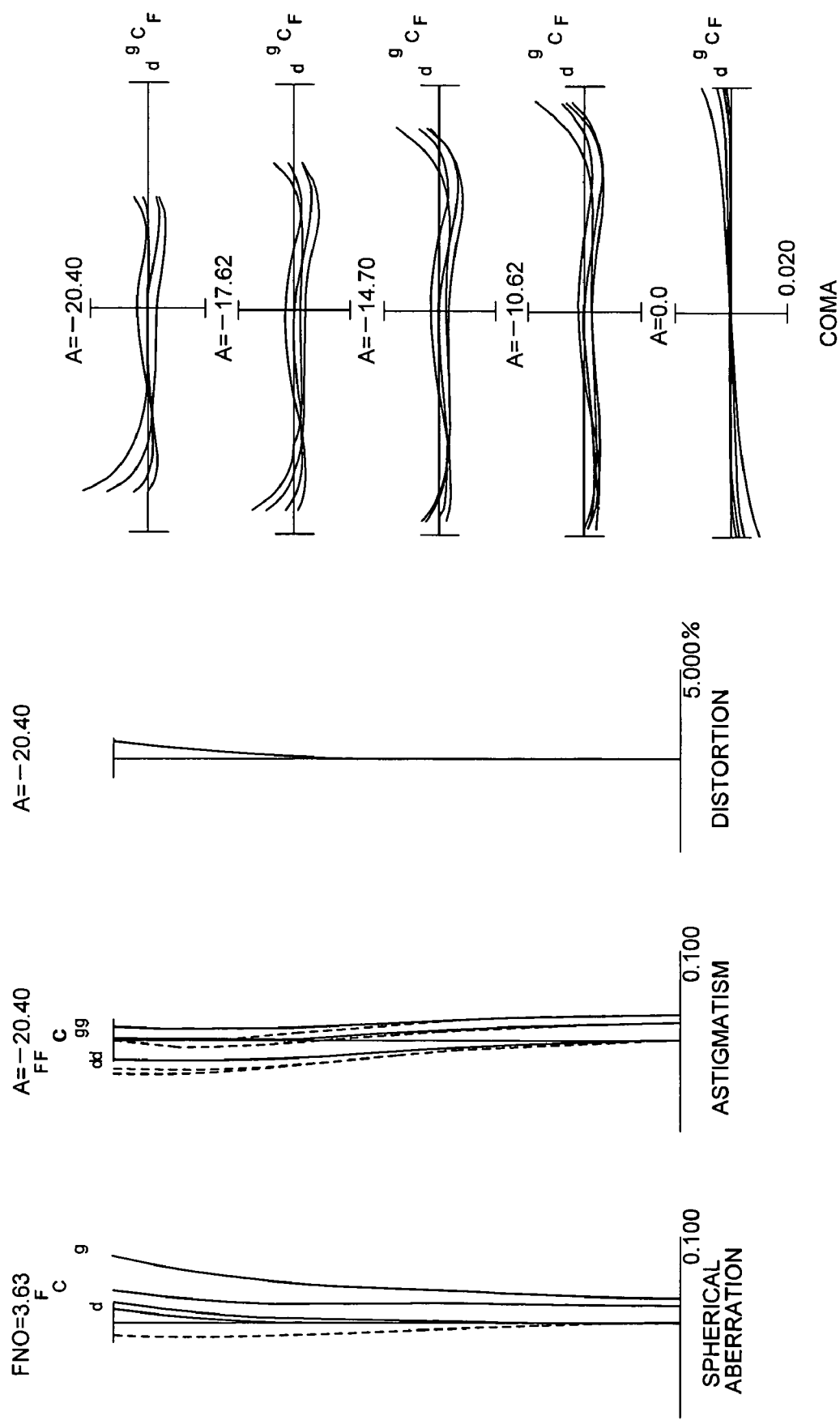
FIG. 10 is graphs showing various aberrations of the zoom lens system according to Example 2 of the first embodiment of the present invention in the intermediate focal length state upon focusing on infinity.
Figure 12:
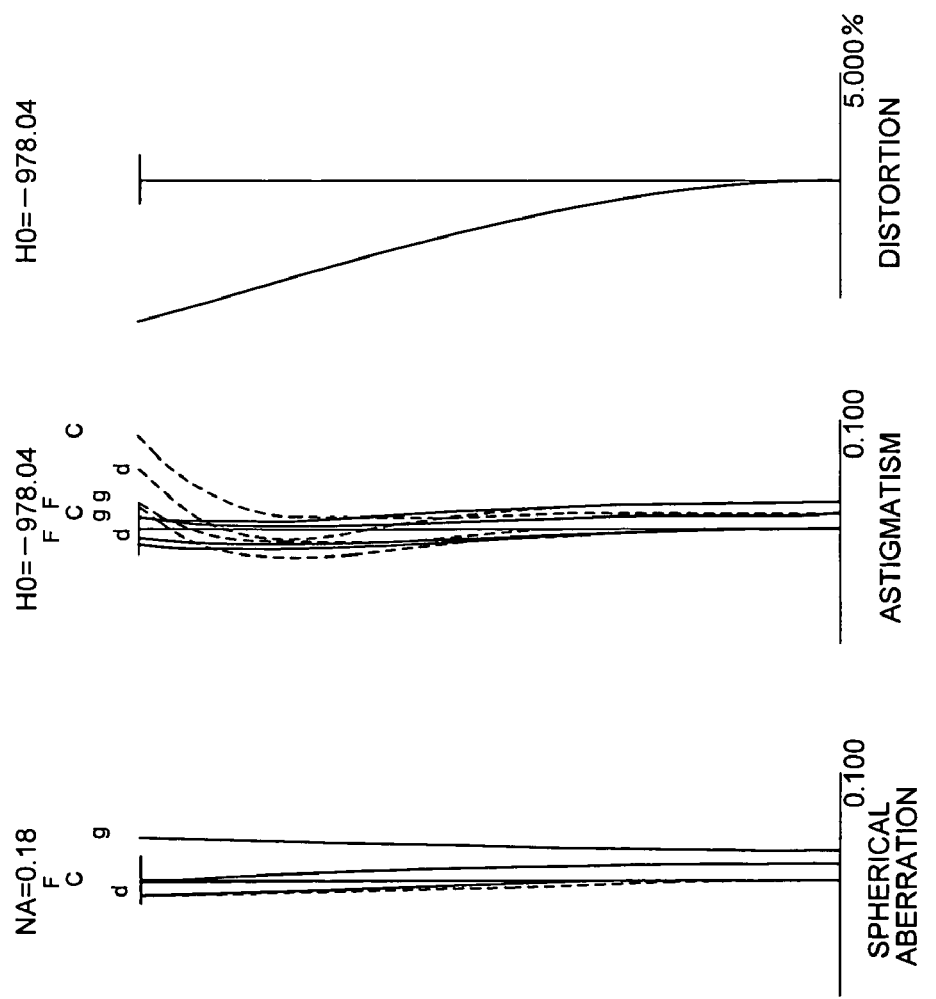
FIG. 12 is graphs showing various aberrations of the zoom lens system according to Example 2 of the first embodiment of the present invention in the wide-angle end state upon focusing on a shooting distance of 1.5 m.
Figure 13:
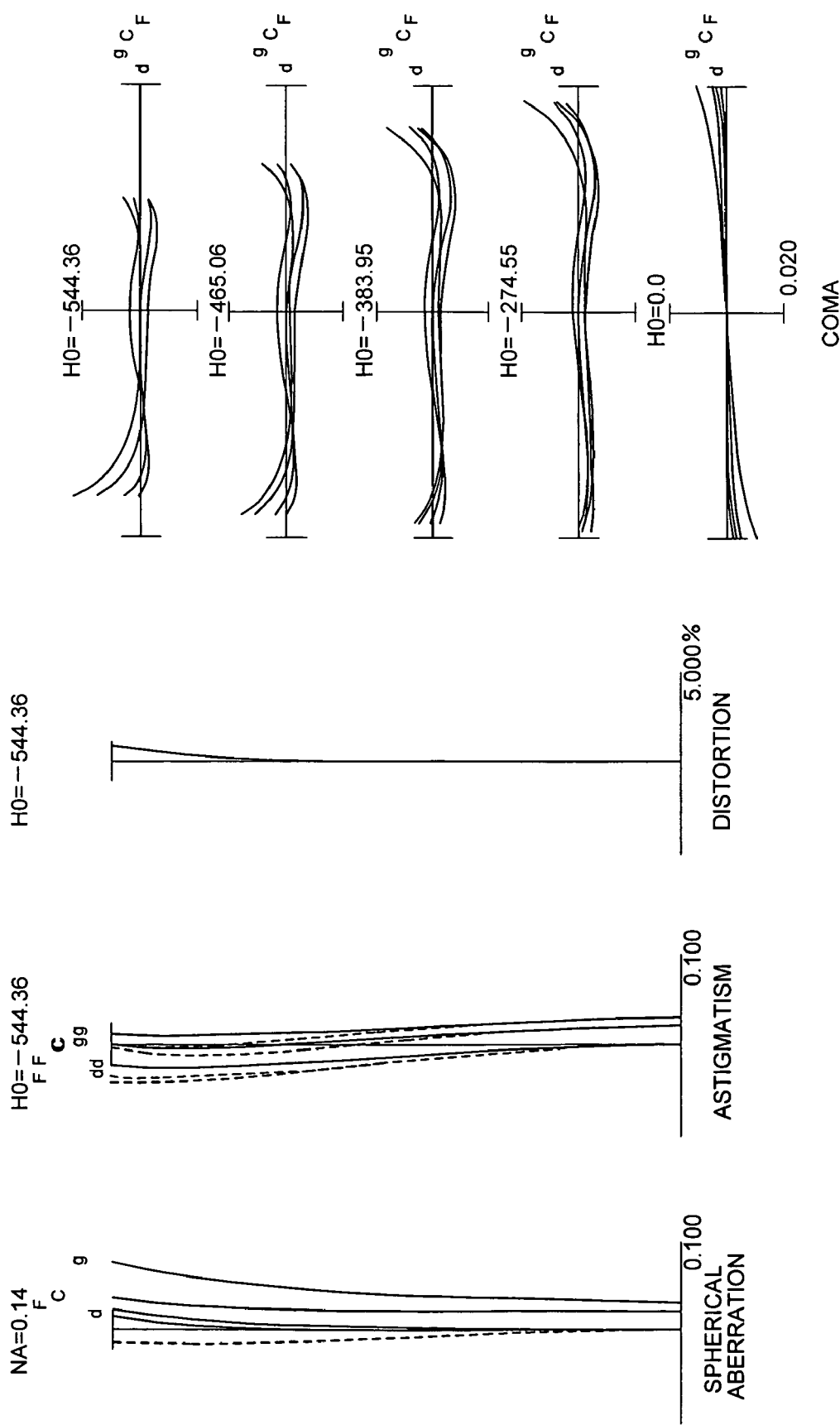
FIG. 13 is graphs showing various aberrations of the zoom lens system according to Example 2 of the first embodiment of the present invention in the intermediate focal length state upon focusing on a shooting distance of 1.5 m.
Figure 14:
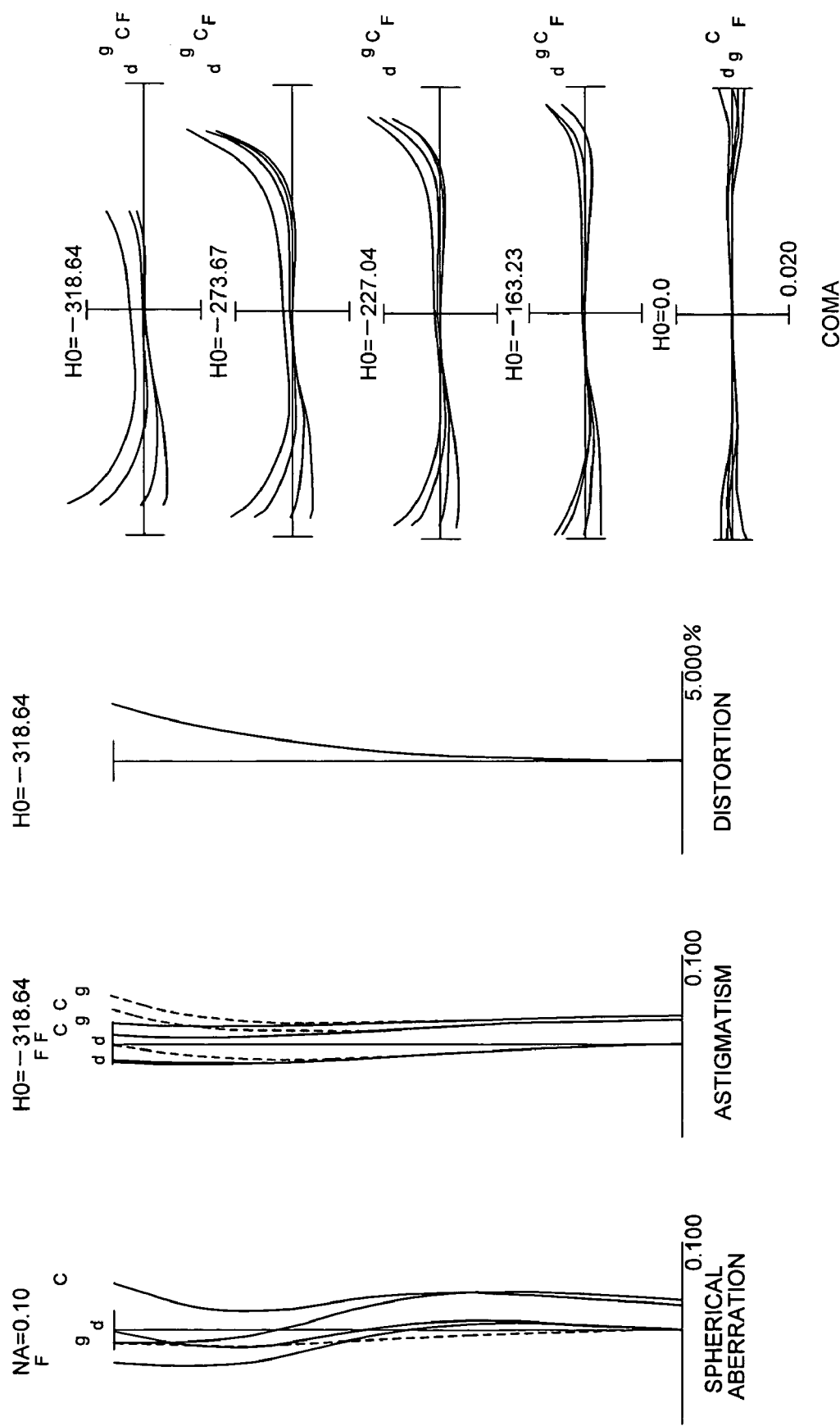
FIG. 14 is graphs showing various aberrations of the zoom lens system according to Example 2 of the first embodiment of the present invention in the telephoto end state upon focusing on a shooting distance of 1.5 m.

FIG. 9 is graphs showing various aberrations of the zoom lens system according to Example 2 of the first embodiment of the present invention in the wide-angle end state upon focusing on infinity. FIG. 10 is graphs showing various aberrations of the zoom lens system according to Example 2 in the intermediate focal length state upon focusing on infinity. FIG. 11 is graphs showing various aberrations of the zoom lens system according to Example 2 in the telephoto end state upon focusing on infinity. FIG. 12 is graphs showing various aberrations of the zoom lens system according to Example 2 in the wide-angle end state upon focusing on a shooting distance of 1.5 m. FIG. 13 is graphs showing various aberrations of the zoom lens system according to Example 2 in the intermediate focal length state upon focusing on a shooting distance of 1.5 m. FIG. 14 is graphs showing various aberrations of the zoom lens system according to Example 2 in the telephoto end state upon focusing on a shooting distance of 1.5 m.

As is apparent from the respective graphs, the zoom lens system according to Example 2 shows superb optical performance as a result of good corrections to various aberrations in each focal length state from the wide-angle end state to the telephoto end state.

EXAMPLE 3

Figure 15:
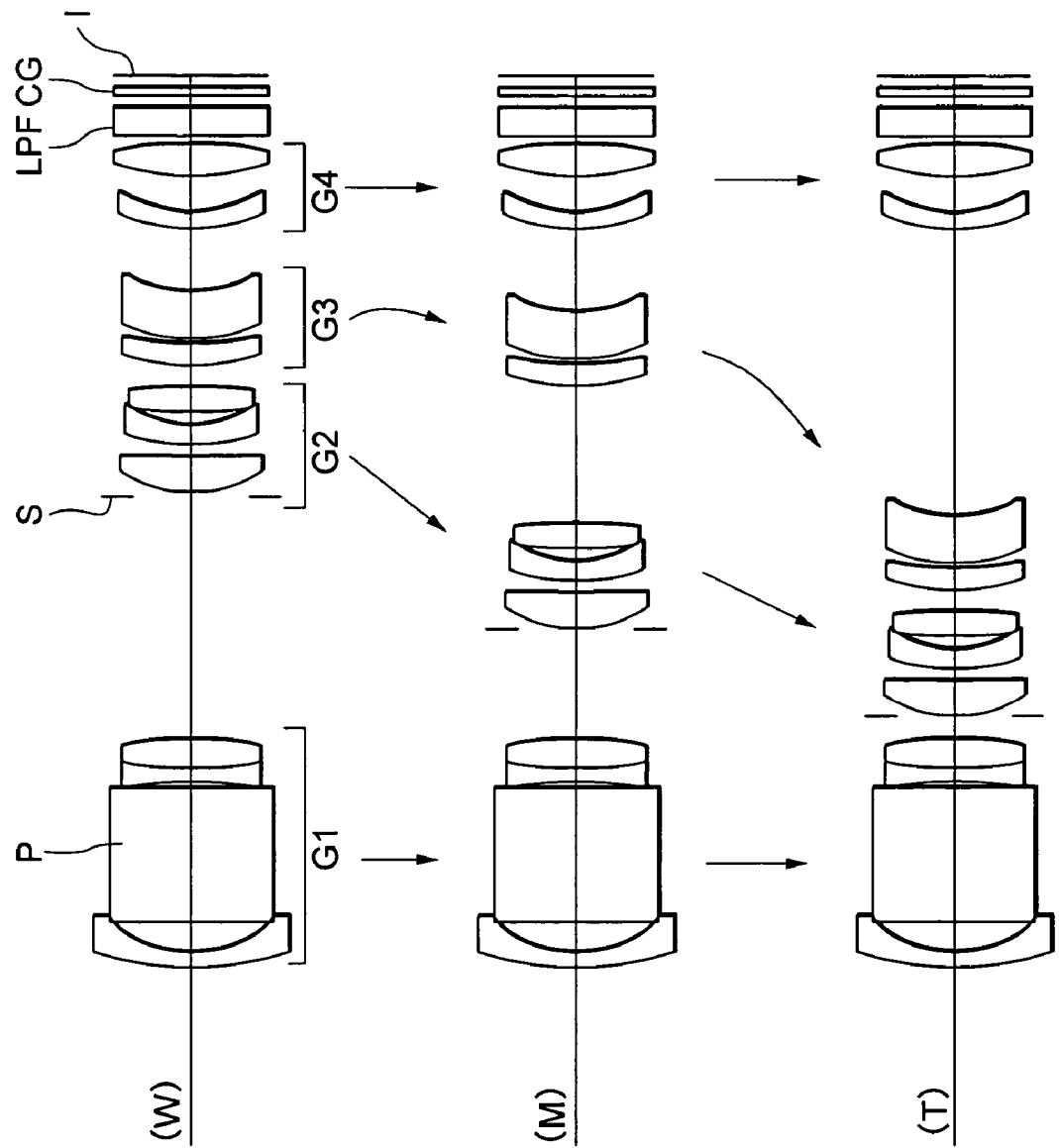
FIG. 15 is a diagram showing the lens arrangement of a zoom lens system according to Example 3 of the first embodiment of the present invention in which (W) shows the wide-angle end state, (M) shows the intermediate focal length state, and (T) shows the telephoto end state.

FIG. 15 is a diagram showing the lens arrangement of a zoom lens system according to Example 3 of the first embodiment of the present invention in which (W) shows the wide-angle end state, (M) shows the intermediate focal length state, and (T) shows the telephoto end state.

In FIG. 15, the zoom lens system according to Example 3 is composed of, in order from the object along the optical axis, a first lens group G1 having negative refractive power, a second lens group G2 having positive refractive power, a third lens group G3 having positive refractive power, and a fourth lens group G4 having positive refractive power. When a state of lens group positions varies from a wide-angle end state W to a telephoto end state T, the first lens group G1 is always fixed, the second lens group G2 and the third lens group G3 are moved, and the fourth lens group G4 is fixed such that a distance between the first lens group G1 and the second lens group G2 decreases, a distance between the second lens group G2 and the third lens group G3 varies. Upon focusing, the second lens group G2 and the third lens group G3 are moved at the same time. An aperture stop S is disposed to the most object side of the second lens group G2 and moved together with the second lens group G2. An optical low-pass filter LPF and a cover glass CG for a solid-state imaging device disposed on an image plane I are arranged between the fourth lens group G4 and the image plane I. Incidentally, a photographic film may be disposed on the image plane I instead of the imaging device. In this case, the cover glass CG is not necessary.

A prism P for folding the optical path by substantially 90 degrees is included in the first lens group G1. The prism P is shown as a plane parallel plate extending the optical path to a straight line. The folding angle of the optical path is not necessary to be 90 degrees and is changeable in accordance with design. A mirror may be used instead of the prism P.

Respective aspherical surfaces are applied to the most image side lens surface of the first lens group G1 and the most object side lens surface of the second lens group G2. In this manner, the zoom lens system according to Example 3 of the first embodiment is constructed.

Various values associated with Example 3 are shown in Table 3.

TABLE 3

[Specifications]

| | W | M | T |
|---|---|---|---|
| f = | 5.94310 | 9.99999 | 16.81000 |
| Bf = | | 0.62170 (constant) | |
| FNO = | 2.77541 | 3.64560 | 4.97090 |
| ω = | 33.99051° | 20.39463° | 12.21416° |

[Lens Data]

| | r | d | ν | n |
|---|---|---|---|---|
| 1) | 18.7658 | 0.8000 | 40.77 | 1.883000 |
| 2) | 5.9781 | 1.6000 | | |
| 3) | 0.0000 | 7.5000 | 40.77 | 1.883000 |
| 4) | 0.0000 | 0.3000 | | |
| 5) | −28.6229 | 0.8000 | 40.77 | 1.883000 |
| 6) | 17.6839 | 1.6000 | 25.63 | 1.794910 |
| 7) | −22.1275 | D1 | | |
| 8> | 0.0000 | 0.0000 | Aperture Stop S | |
| 9) | 6.3864 | 2.0000 | 61.24 | 1.589130 |
| 10) | 315.2868 | 0.6000 | | |
| 11) | 12.6168 | 1.1700 | 23.78 | 1.846660 |
| 12) | 5.7705 | 0.8000 | | |
| 13) | 38.2216 | 1.3000 | 55.52 | 1.696800 |
| 14) | −24.8002 | D2 | | |
| 15) | 11.0500 | 1.3000 | 81.61 | 1.497000 |
| 16) | 25.1658 | 0.2000 | | |
| 17) | 10.0164 | 2.5000 | 23.78 | 1.846660 |
| 18) | 6.9123 | D3 | | |
| 19) | 11.0455 | 0.8000 | 40.77 | 1.883000 |
| 20) | 7.3828 | 2.0000 | | |
| 21) | 16.0651 | 1.7000 | 55.52 | 1.696800 |
| 22) | −23.3870 | 0.5000 | | |
| 23) | 0.0000 | 1.6600 | 70.51 | 1.544370 |
| 24) | 0.0000 | 0.5000 | | |

TABLE 3-continued

| 25) | 0.0000 | 0.5000 | 64.14 | 1.516330 |
|---|---|---|---|---|
| 26) | 0.0000 | Bf | | |

[Aspherical Data]

Surface Number 7

κ = −0.8297
C2 = 0.00000E+00
C4 = −1.64610E−04
C6 = −3.52760E−06
C8 = 1.97330E−07
C10 = −8.99180E−09

Surface Number 9

κ = 1.0068
C2 = 0.00000E+00
C4 = −3.52690E−04
C6 = −3.57830E−06
C8 = −1.68940E−07
C10 = 0.00000E+00

| | W | M | T |
|---|---|---|---|
| [Zooming Data] | | | |
| D1 | 13.43483 | 6.14406 | 1.19996 |
| D2 | 1.20001 | 7.56362 | 1.20001 |
| D3 | 3.56874 | 4.49591 | 15.80361 |
| [Focusing Data] shooting distance = 1.5 m | | | |
| D1 | 13.38889 | 6.23254 | 1.32900 |
| D2 | 1.20001 | 7.38665 | 1.20001 |
| D3 | 3.61468 | 4.58439 | 15.67457 |

[Values for Conditional Expressions]

f2/f3 = 0.106456
nd1 = 1.882997
nd2 = 1.882997

Figure 16:
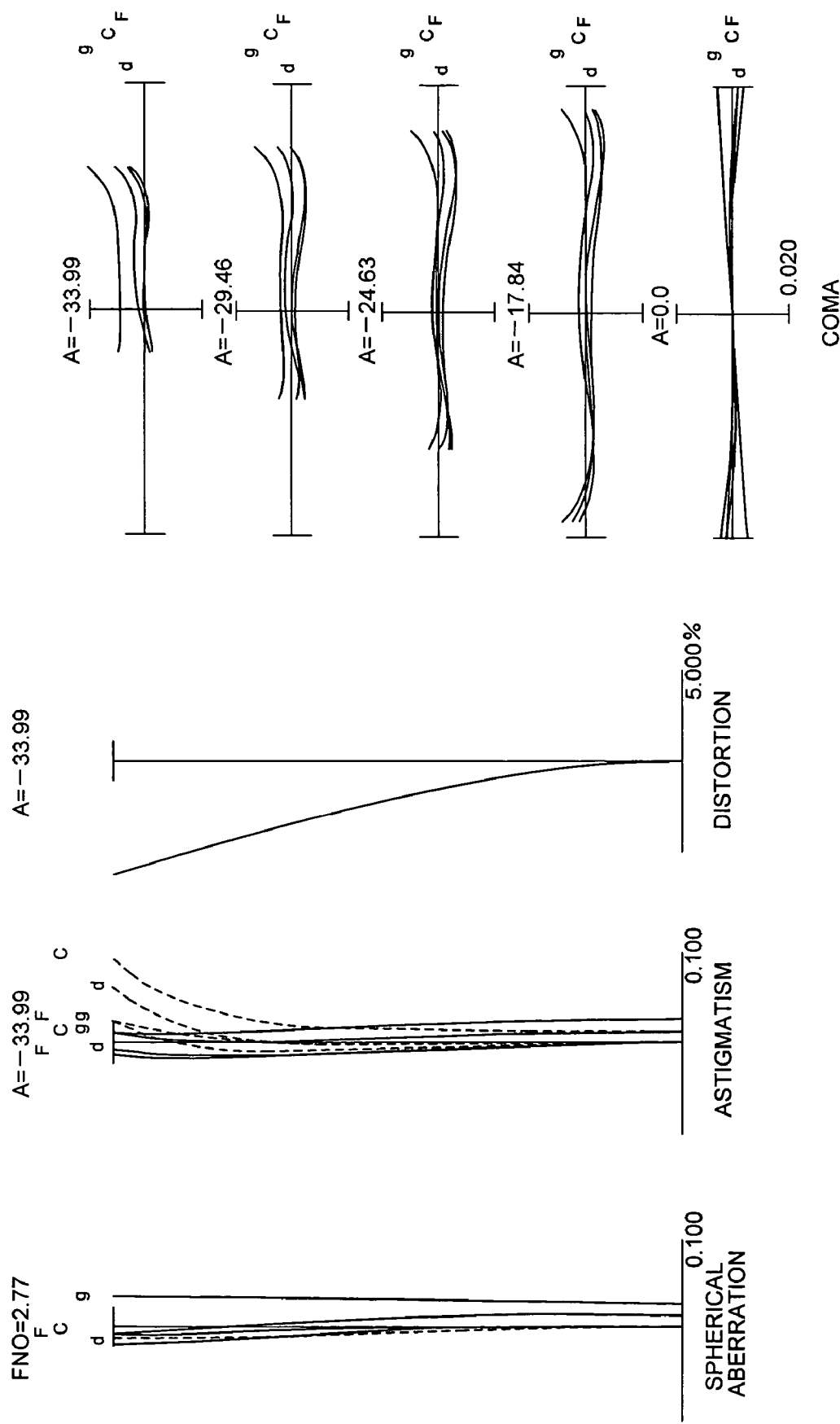
FIG. 16 is graphs showing various aberrations of the zoom lens system according to Example 3 of the first embodiment of the present invention in the wide-angle end state upon focusing on infinity.
Figure 17:
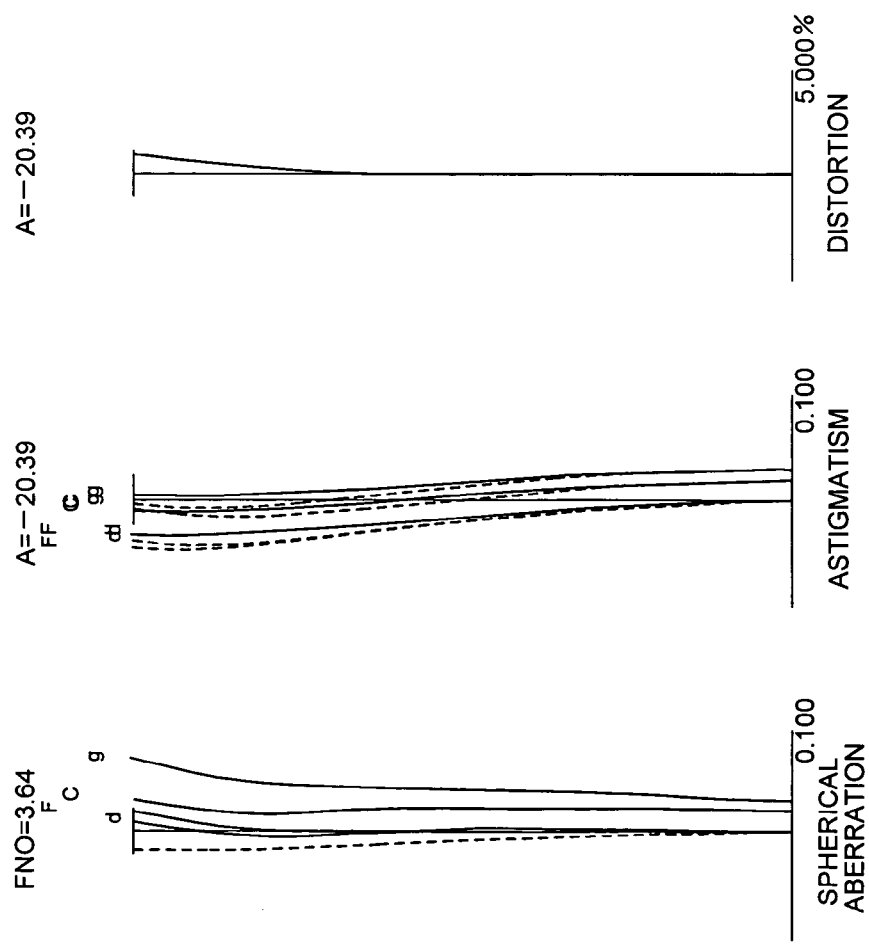
FIG. 17 is graphs showing various aberrations of the zoom lens system according to Example 3 of the first embodiment of the present invention in the intermediate focal length state upon focusing on infinity.
Figure 18:
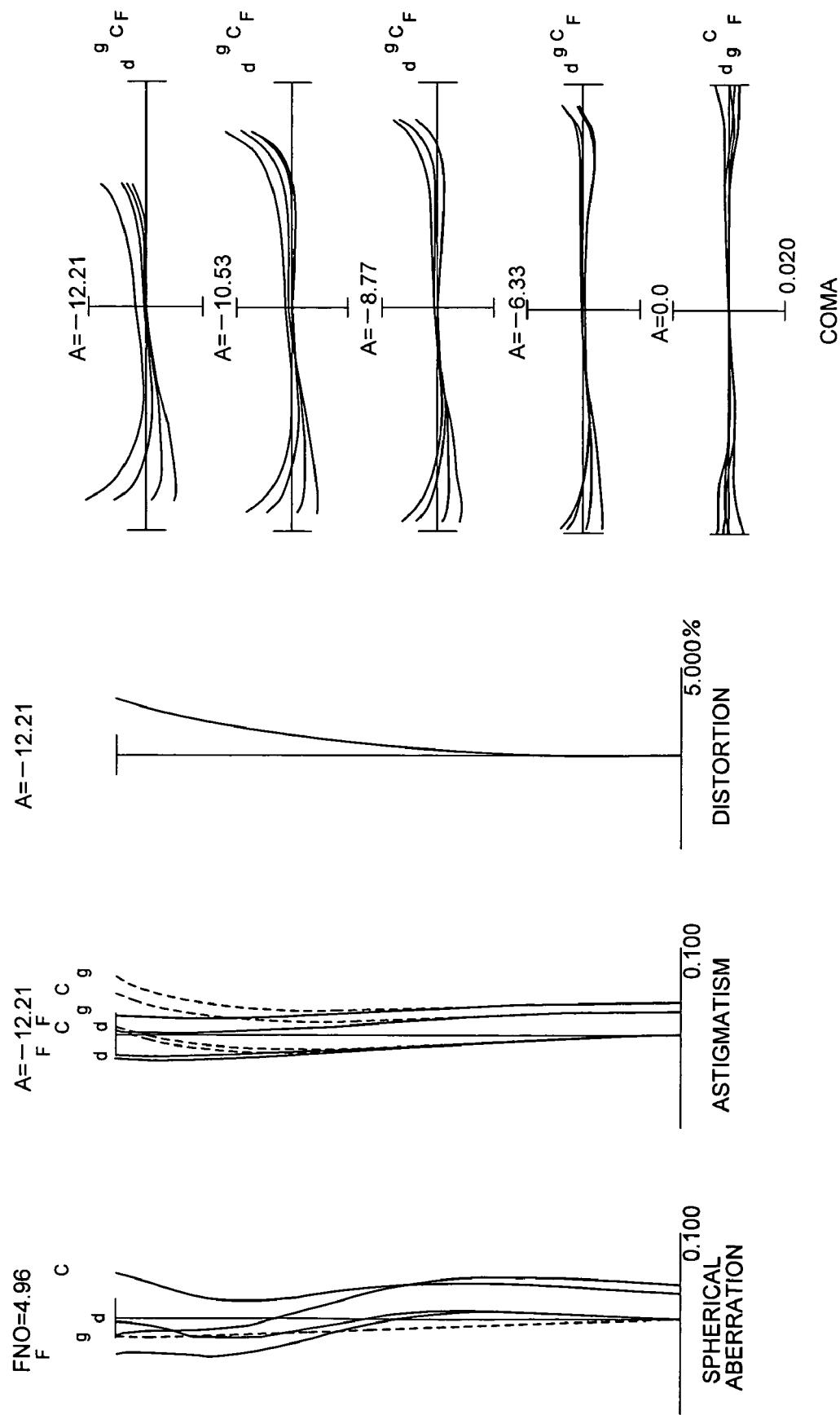
FIG. 18 is graphs showing various aberrations of the zoom lens system according to Example 3 of the first embodiment of the present invention in the telephoto end state upon focusing on infinity.
Figure 19:
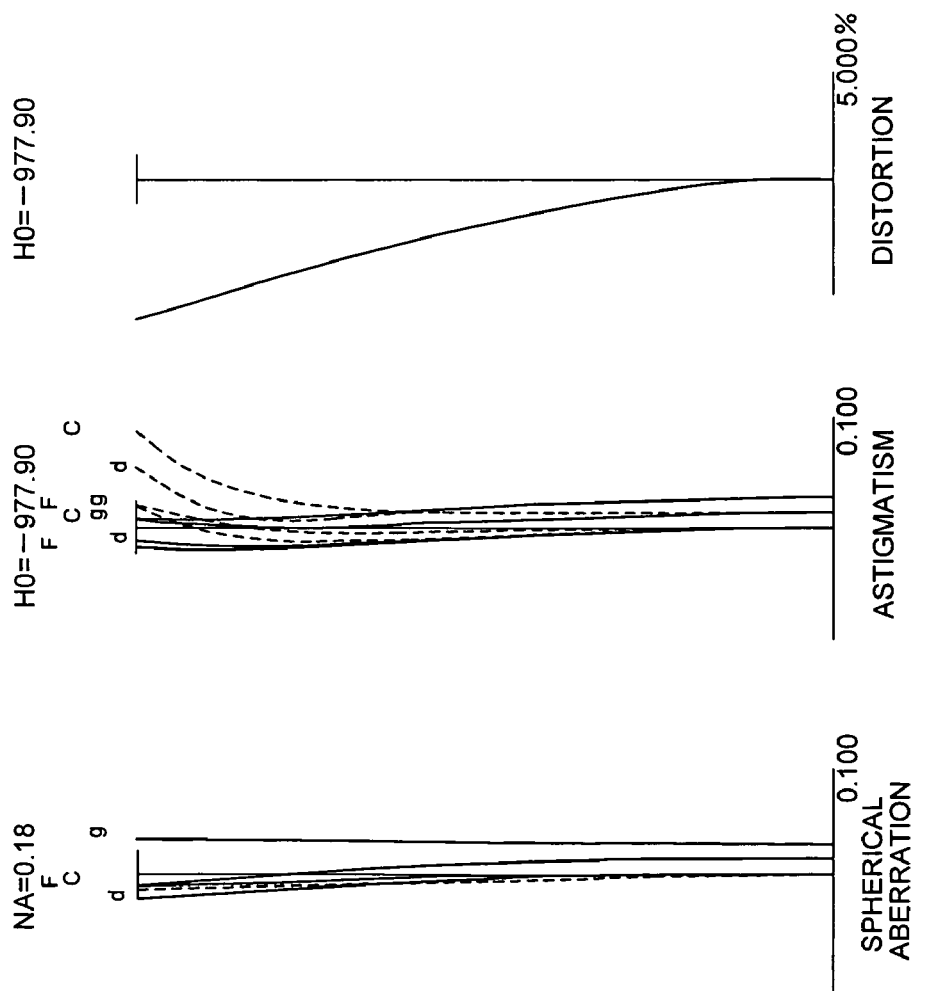
FIG. 19 is graphs showing various aberrations of the zoom lens system according to Example 3 of the first embodiment of the present invention in the wide-angle end state upon focusing on a shooting distance of 1.5 m.
Figure 20:
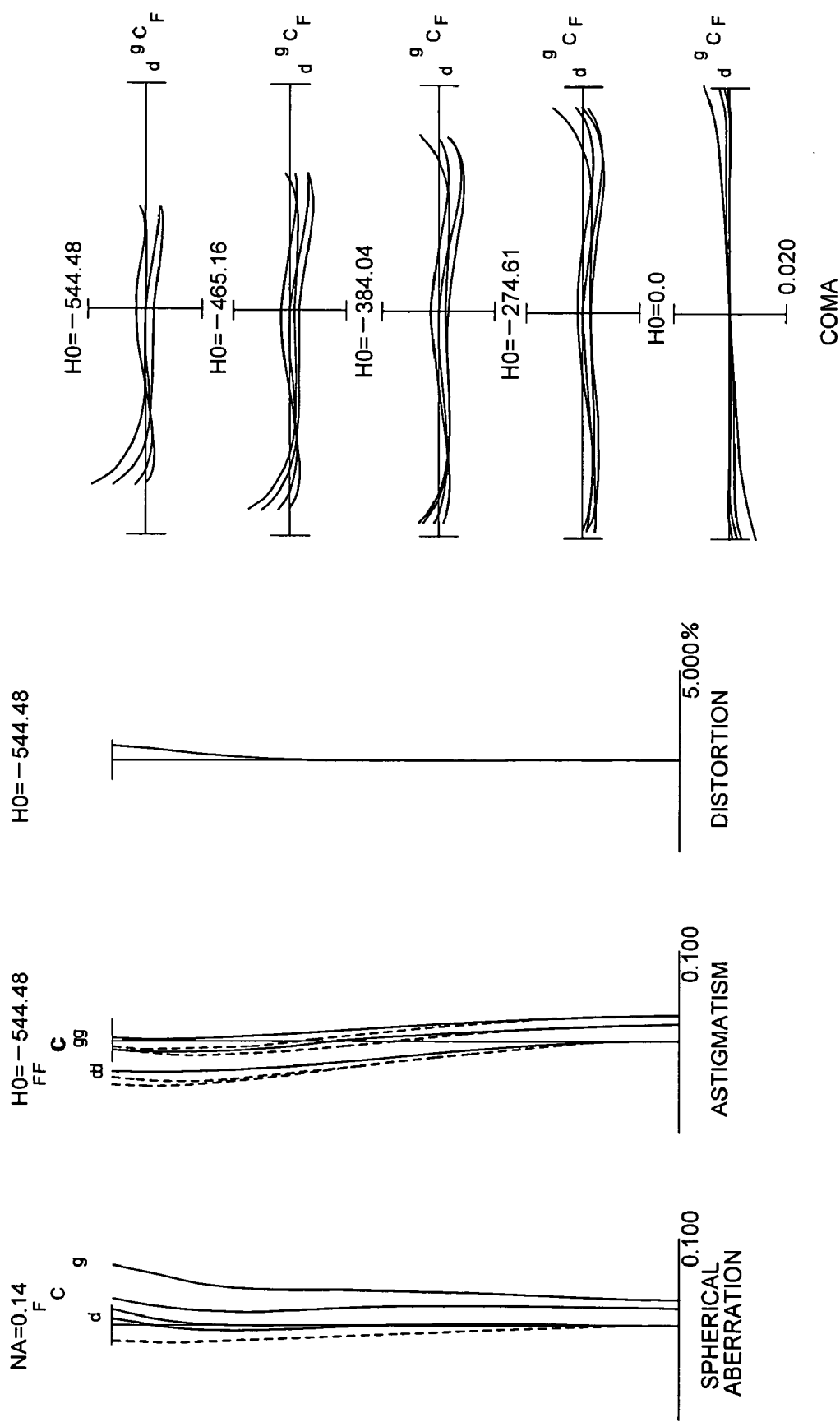
FIG. 20 is graphs showing various aberrations of the zoom lens system according to Example 3 of the first embodiment of the present invention in the intermediate focal length state upon focusing on a shooting distance of 1.5 m.

FIG. 16 is graphs showing various aberrations of the zoom lens system according to Example 3 of the first embodiment of the present invention in the wide-angle end state upon focusing on infinity. FIG. 17 is graphs showing various aberrations of the zoom lens system according to Example 3 in the intermediate focal length state upon focusing on infinity. FIG. 18 is graphs showing various aberrations of the zoom lens system according to Example 3 in the telephoto end state upon focusing on infinity. FIG. 19 is graphs showing various aberrations of the zoom lens system according to Example 3 in the wide-angle end state upon focusing on a shooting distance of 1.5 m. FIG. 20 is graphs showing various aberrations of the zoom lens system according to Example 3 in the intermediate focal length state upon focusing on a shooting distance of 1.5 m. FIG. 21 is graphs showing various aberrations of the zoom lens system according to Example 3 in the telephoto end state upon focusing on a shooting distance of 1.5 m.

As is apparent from the respective graphs, the zoom lens system according to Example 3 shows superb optical performance as a result of good corrections to various aberrations in each focal length state from the wide-angle end state to the telephoto end state.

In each Example, any surface of any lens group may be made a diffractive optical surface. In all lens groups, any lens element may be made a graded index lens (GRIN lens) or a plastic lens. In all lens groups, by shifting any lens group or a portion of any lens group perpendicularly to the optical axis or along a curve centered at a point, the zoom lens system can be made as a vibration reduction lens.

Incidentally, it is needless to say that although a zoom lens systems with a four-lens-group configuration are shown as examples of the first embodiment of the present invention, a zoom lens system simply added a lens group to a four-lens-group configuration is included in the spirit of the present invention. Moreover, in the configuration of each lens group, a lens group simply adding additional lens elements to the lens group shown in examples is included in the spirit or scope of the present invention.

Second Embodiment

A zoom lens system according to a second embodiment of the present invention is explained below.

A zoom lens system according to a second embodiment of the present invention includes, in order from an object along an optical axis, a first lens group having negative refractive power, a second lens group having positive refractive power, a third lens group having positive refractive power, and a fourth lens group having positive refractive power. Upon zooming from a wide-angle end state to a telephoto end state and focusing, the first lens group and the fourth lens group are always fixed. Upon zooming from the wide-angle end state to the telephoto end state, the second lens group and the third lens group are moved respectively. Upon focusing from infinity to a close object, the second lens group and the third lens group are moved respectively. Upon focusing from infinity to a close object, although the second lens group and the third lens group are moved along the optical axis in a body in the wide-angle end state and in the telephoto end state, the moving direction in the wide-angle end state is opposite to that in the telephoto end state. In the other focal length states, the second lens group and the third lens group are moved along the optical axis in the opposite directions with each other. An optical-path-folding optics for folding the optical path is disposed in the first lens group.

In the zoom lens system according to the second embodiment of the present invention, since the first lens group, which is the largest lens group in the zoom lens system disposed to the most object side, is always fixed upon zooming from the wide-angle end state to the telephoto end state and upon focusing, the mechanical structure can be simple.

In the zoom lens system according to the second embodiment of the present invention, since zooming is carried out by a plurality of lens groups except the first lens group which is the largest lens group, a driver which is smaller than the previous one may be used.

In the zoom lens system according to the second embodiment of the present invention, since the second lens group and the third lens group are moved at once respectively upon focusing, a driver for zooming can be used for focusing, so that the number of drivers can be reduced.

In the zoom lens system according to the second embodiment of the present invention, by using two lens groups upon focusing, it becomes possible to keep superb optical performance upon changing a shooting distance. With this construction, the moving amount of each lens group using for focusing can be kept small relative to the case where focusing is carried out by any one lens group, so that the total length of the zoom lens system can be small.

In the zoom lens system according to the second embodiment of the present invention, upon focusing from infinity to a close object, the second lens group and the third lens group are moved respectively, the second lens group and the third lens group are moved along the optical axis in a body in the wide-angle end state and the telephoto end state and the moving direction in the wide-angle end state is opposite to that in the telephoto end state, and the second lens group and the third lens group are moved along the optical axis in the opposite directions with each other in the other focal length states. Accordingly, the best focusing characteristic can be kept in respective focal length states.

In the zoom lens system according to the second embodiment of the present invention, an optical-path-folding optics is disposed in the first lens group and the following conditional expressions (2) and (4) are preferably satisfied:

$$1.70 < nd1 \tag{2}$$

$$nd1 \leq nd2 \tag{4}$$

where $nd1$ denotes refractive index of the optical-path-folding optics, and $nd2$ denotes refractive index of a lens disposed to the object side of the optical-path-folding optics.

Conditional expression (2) defines an appropriate range of refractive index of the optical-path-folding optics. When the value $nd1$ is equal to or falls below the lower limit of conditional expression (2), the dimension of the folding optics becomes large and the zoom lens system as a whole becomes large, so that it is undesirable. In order to secure the effect of the present invention, it is preferable to set the lower limit of conditional expression (2) to 1.75. In order to further secure the effect of the present invention, it is preferable to set the lower limit of conditional expression (2) to 1.80.

Conditional expression (4) defines an appropriate range of refractive index of the optical-path-folding optics and that of the lens disposed to the object side of the optical-path-folding optics. When refractive index of the optical-path-folding optics is larger than that of the lens disposed to the object side of the optical-path-folding optics, the effective diameter of the lens disposed to the object side of the folding optics becomes large. As a result, the size of the optical-path-folding optics has to be large, so that it becomes difficult to miniaturize the zoom lens system.

In the zoom lens system according to the second embodiment of the present invention, the second lens group is composed of, in order from the object, a single lens having positive refractive power, a cemented negative lens, and a single lens having positive refractive power and the following conditional expression (5) is preferably satisfied:

$$0.1 < f21/(-f22) < 1.0 \tag{5}$$

where $f21$ denotes the focal length of the most object side single lens having positive refractive power, and $f22$ denotes the focal length of the cemented lens having negative refractive power.

Conditional expression (5) is for suitably arranging power distribution in the second lens group. When the ratio $f21/(-f22)$ is equal to or exceeds the upper limit of conditional expression (5), the ability to correct spherical aberration becomes excessively low, so that optical performance becomes worse. On the other hand, when the ratio $f21/(-f22)$ is equal to or falls below the lower limit of conditional expression (5), the ability to correct astigmatism and coma becomes excessively low, so that optical performance becomes worse and the tolerance of the most object side single lens having positive refractive power becomes severe. As a result, the zoom lens system becomes difficult to be manufactured. In order to secure the effect of the present invention, it is preferable to set the lower limit of conditional expression (5) to 0.5 and the upper limit to 0.9.

In the zoom lens system according to the second embodiment of the present invention, it is preferable that an aperture stop for adjusting light quantity is arranged to the most object side of the second lens group and moves together with the second lens group upon zooming. Accordingly, it becomes possible to carry out light quantity adjustment.

On the other hand, when the aperture stop is fixed upon zooming, it becomes necessary to prepare a member for holding the aperture stop and to secure a space for the member in the optical system. As a result, the total lens length becomes long, so that it is undesirable.

In the zoom lens system according to the second embodiment of the present invention, it is preferable that the most image side lens in the first lens group is an aspherical lens. With this construction, distortion produced upon zooming can be preferably corrected. Moreover, the first lens group can be kept small.

On the other hand, when the most image side lens in the first lens group is not an aspherical lens, since the first lens group is fixed upon zooming, it becomes difficult to preferably correct curvature of field produced in the first lens group, so that required optical performance cannot be accomplished.

In the zoom lens system according to the second embodiment of the present invention, it is preferable that the most object side lens in the second lens group is an aspherical lens. With this construction, it becomes possible to preferably correct spherical aberration and coma over entire zoom range.

On the other hand, when the most object side lens in the second lens group is not an aspherical lens, it becomes difficult to preferably correct spherical aberration and astigmatism produced in the second lens group, so that required optical performance cannot be accomplished.

Each Example of the zoom lens system according to the second embodiment of the present invention is explained below with reference to accompanying drawings.

EXAMPLE 4

Figure 22:
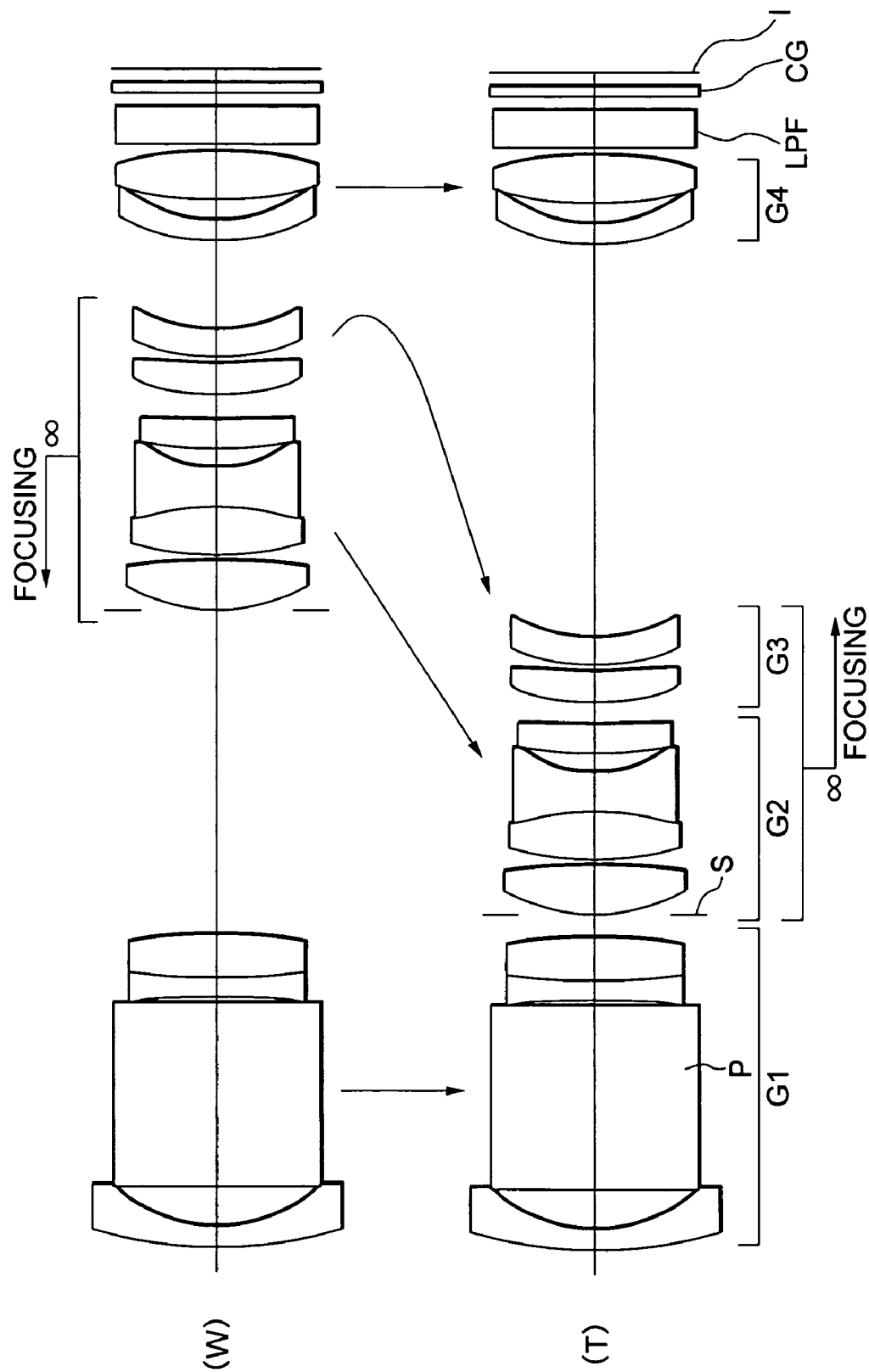
FIG. 22 is a diagram showing the lens arrangement of a zoom lens system according to Example 4 of a second embodiment of the present invention in which (W) shows the wide-angle end state, and (T) shows the telephoto end state.

FIG. 22 is a diagram showing the lens arrangement of a zoom lens system according to Example 4 of a second embodiment of the present invention in which (W) shows the wide-angle end state, and (T) shows the telephoto end state.

In FIG. 22, the zoom lens system according to Example 4 of a second embodiment is composed of, in order from an object, a first lens group G1 having negative refractive power, a second lens group G2 having positive refractive power, a third lens group G3 having positive refractive power, and a fourth lens group G4 having positive refractive power. The first lens group G1 and the fourth lens group G4 are always fixed upon zooming from a wide-angle end state W to a telephoto end state T and focusing. The second lens group G2 and the third lens group G3 are moved upon zooming from the wide-angle end state W to the telephoto end state T. The second lens group G2 and the third lens group G3 are moved respectively upon focusing from infinity ($\infty$) to a close object. An optical low-pass filter LPF and a cover glass CG for a solid-state imaging device disposed on an image plane I are disposed between the fourth lens group G4 and the image plane I. Incidentally, a photographic film may be disposed on the image plane I instead of the imaging device. In this case, the cover glass CG is not necessary to be used.

A prism P for folding the optical path by substantially 90 degrees is included in the first lens group G1. The prism P is shown as a plane parallel plate extending the optical path to a straight line. The folding angle of the optical path is not necessary to be 90 degrees and is changeable in accordance with design. A mirror may be used instead of the prism P.

Respective aspherical surfaces are applied to the most image side lens surface of the first lens group G1 and the most object side lens surface of the second lens group G2. In this manner, the zoom lens system according to Example 4 of the second embodiment is constructed.

Figure 31:
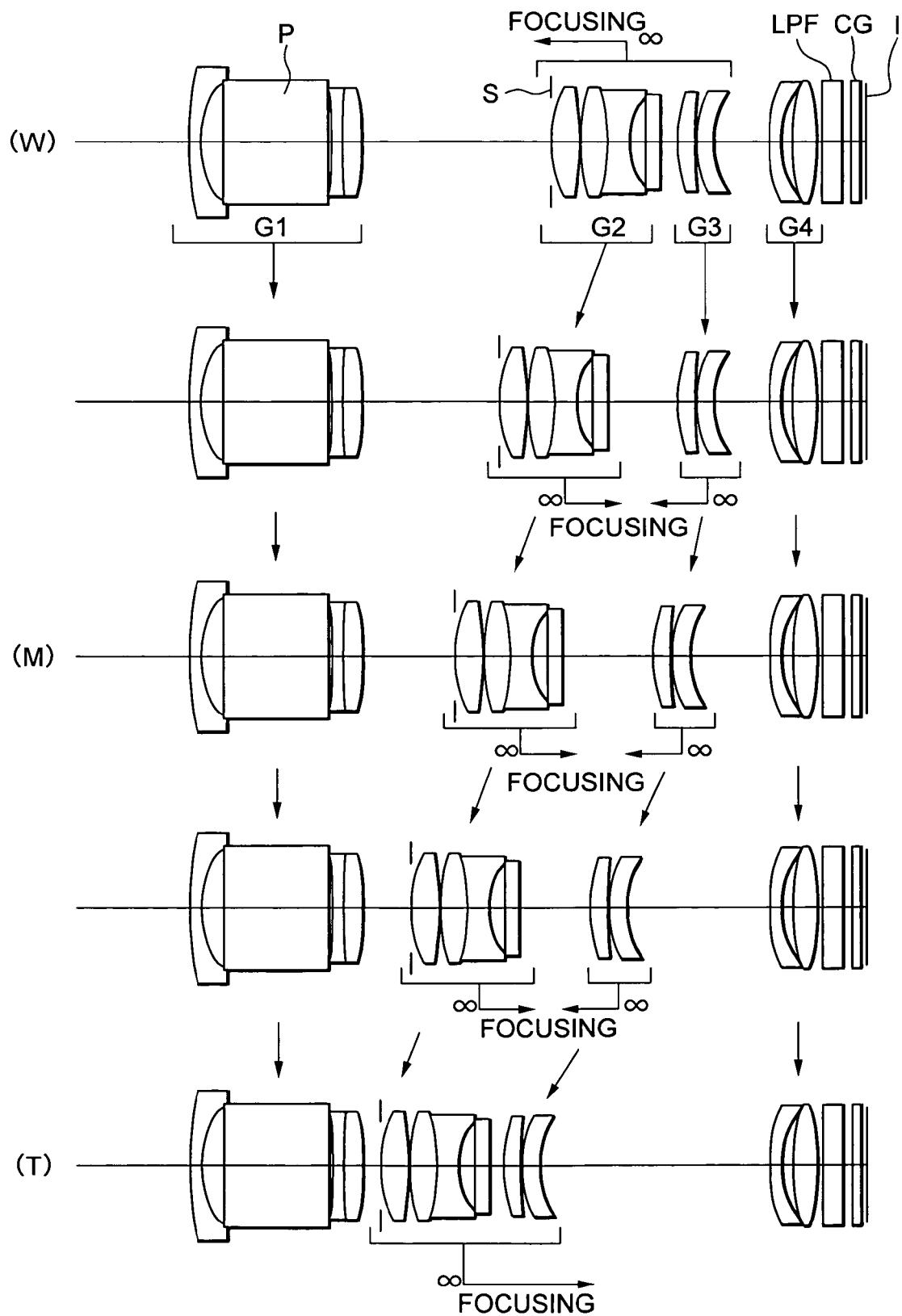
FIG. 31 is a diagram showing moving directions of the second lens group G2 and the third lens group G3 upon focusing from infinity to a close object in each focal length state of a zoom lens system according to each example of the second embodiment in which (W) denotes the wide-angle end state, (M) denotes the intermediate focal length state, and (T) denotes the telephoto end state.

FIG. 31 is a diagram showing moving directions of the second lens group G2 and the third lens group G3 upon focusing from infinity ($\infty$) to a close object in each focal length state of a zoom lens system according to each example of the second embodiment in which (W) denotes the wide-angle end state, (M) denotes the intermediate focal length state, and (W) denotes the telephoto end state.

As shown in FIG. 31, upon focusing from infinity ($\infty$) to a close object, the second lens group G2 and the third lens group G3 are moved along the optical axis to the object in a body in the wide-angle end state, the second lens group G2 and the third lens group G3 are moved along the optical axis to the image side in a body in the telephoto end state, and the second lens group G2 is moved to the image and the third lens group G3 is moved to the object in the other focal length states (such as the intermediate focal length state M).

Various values associated with Example 4 are shown in Table 4.

TABLE 4

| [Specifications] | | | |
|---|---|---|---|
| | W | M | T |
| f = | 5.94504 | 10.00000 | 16.86433 |
| Bf = | | 0.60401 (constant) | |
| FNO = | 2.93733 | 3.93125 | 5.34175 |
| ω = | 34.06406° | 20.48995° | 12.21280° |

| [Lens Data] | | | |
|---|---|---|---|
| r | d | ν | n |
| 1) 21.9689 | 0.8000 | 40.77 | 1.883000 |
| 2) 6.1015 | 1.6500 | | |
| 3) 0.0000 | 7.7000 | 46.58 | 1.804000 |
| 4) 0.0000 | 0.3000 | | |
| 5) −25.0938 | 0.8000 | 40.77 | 1.883000 |
| 6) 42.3960 | 1.8000 | 24.06 | 1.821140 |
| 7*) −20.4320 | (D1) | | |
| 8> 0.0000 | 0.0000 | Aperture Stop S | |
| 9*) 7.6923 | 2.1000 | 61.18 | 1.589130 |
| 10) −24.9919 | 0.2000 | | |
| 11) 12.7999 | 2.0000 | 81.61 | 1.497000 |
| 12) −12.7999 | 1.7000 | 36.26 | 1.620040 |
| 13) 5.2389 | 0.8000 | | |
| 14) 23.5381 | 1.2000 | 55.34 | 1.677900 |
| 15) 131.5104 | (D2) | | |
| 16) 9.9222 | 1.3000 | 81.61 | 1.497000 |
| 17) 25.8023 | 0.2000 | | |
| 18) 8.3050 | 1.2000 | 25.43 | 1.805180 |
| 19) 6.5377 | (D3) | | |
| 20) 9.2034 | 0.8000 | 54.84 | 1.691000 |
| 21) 6.4052 | 0.8500 | | |
| 22) 16.7948 | 2.0000 | 61.18 | 1.589130 |
| 23) −16.7948 | 0.3000 | | |
| 24) 0.0000 | 1.5200 | 70.51 | 1.544370 |
| 25) 0.0000 | 0.5217 | | |

TABLE 4-continued

| | | | | |
|---|---|---|---|---|
| 26) | 0.0000 | 0.5000 | 64.14 | 1.516330 |
| 27) | 0.0000 | (Bf) | | |

[Aspherical Data]

Surface Number 7

κ = −7.3287
C2 = 0.00000E−00
C4 = −2.36400E−04
C6 = −5.27710E−07
C8 = −1.74530E−08
C10 = 0.00000E−00

Surface Number 9

κ = −0.0148
C2 = 0.00000E−00
C4 = −4.02620E−06
C6 = +3.32450E−07
C8 = −7.80010E−09
C10 = 0.00000E−00

| | W | M | T |
|---|---|---|---|
| | [Zooming Data] | | |
| D1 | 13.77611 | 6.54611 | 1.02611 |
| D2 | 1.05409 | 6.61129 | 0.95529 |
| D3 | 2.88206 | 4.55486 | 15.73086 |
| | [Focusing Data] shooting distance = 1.5 m | | |
| D1 | 13.72629 | 6.62877 | 1.16493 |
| D2 | 1.05409 | 6.44598 | 0.95529 |
| D3 | 2.93188 | 4.63752 | 15.59204 |

[Values for Conditional Expressions]

nd1 = 1.80400
nd2 = 1.88300
f21/(−f22) = 0.806036

Figure 23A:
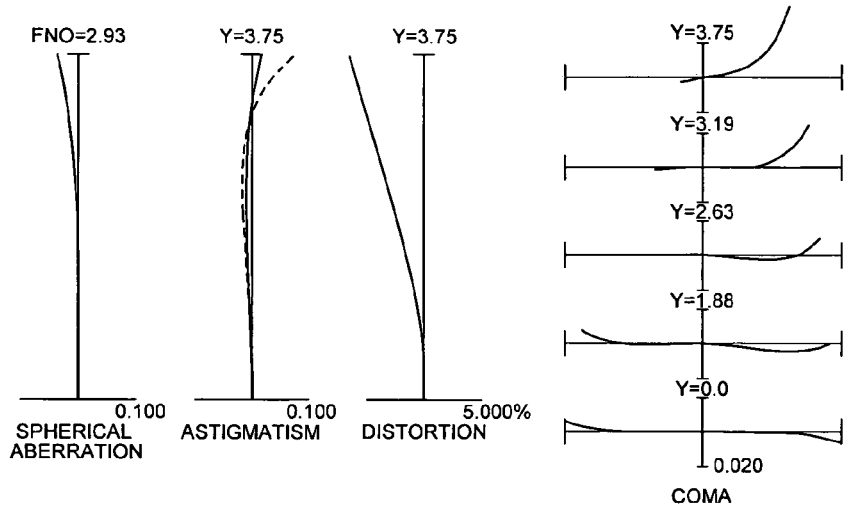
Figure 23B:
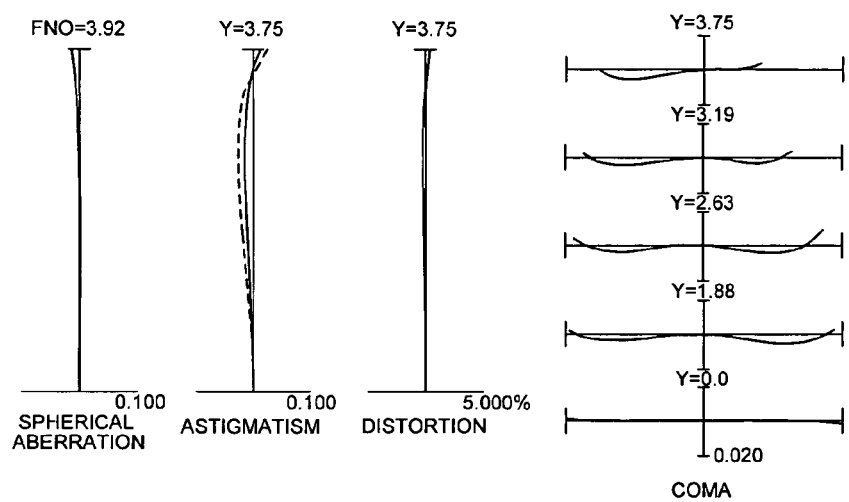
Figure 23C:
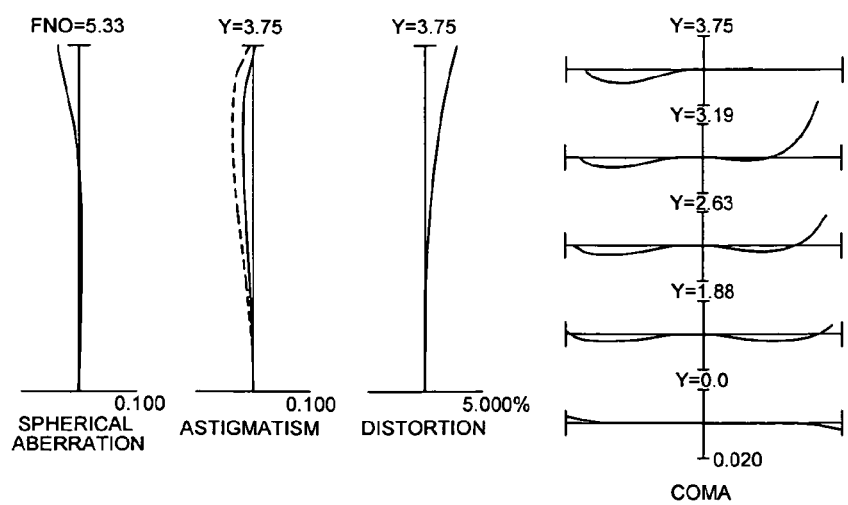

FIGS. 23A, 23B, and 23C are graphs showing various aberrations of the zoom lens system according to Example 4 upon focusing on infinity in which FIG. 23A shows the wide-angle end state, FIG. 23B shows the intermediate focal length state, and FIG. 23C shows the telephoto end state.

Figure 24A:
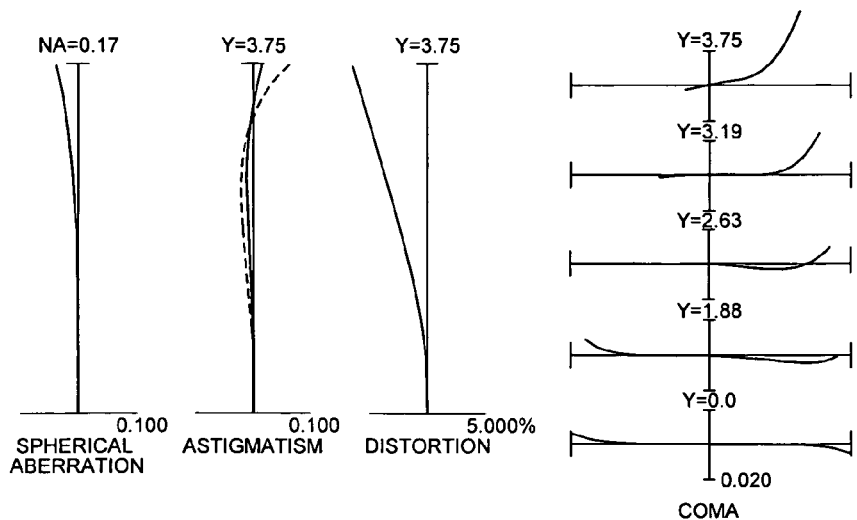
Figure 24B:
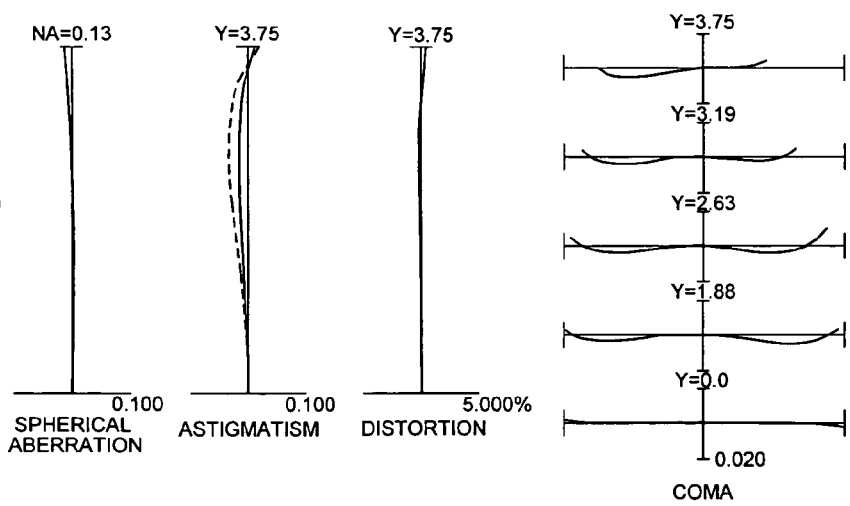
Figure 24C:
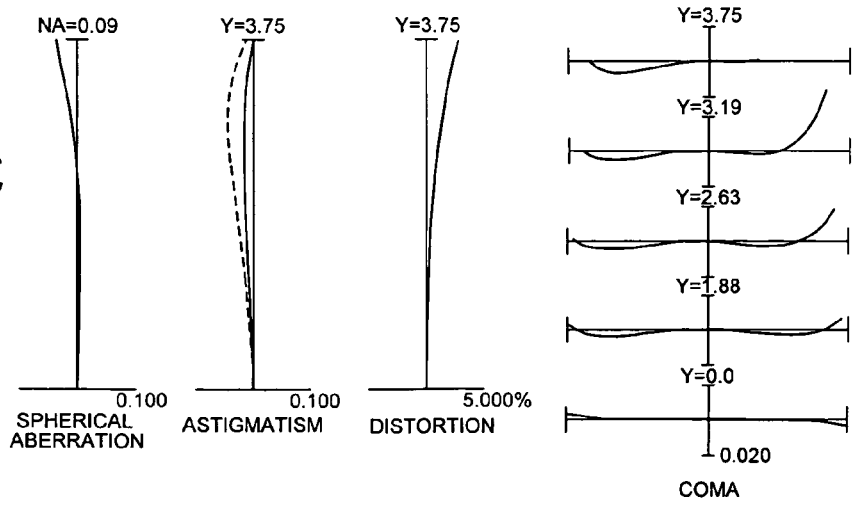

FIGS. 24A, 24B, and 24C are graphs showing various aberrations of the zoom lens system according to Example 4 upon focusing on a shooting distance of 1.5 m in which FIG. 24A shows the wide-angle end state, FIG. 24B shows the intermediate focal length state, and FIG. 24C shows the telephoto end state.

As is apparent from the respective graphs, the zoom lens system according to Example 4 shows superb optical performance as a result of good corrections to various aberrations in each focal length state from the wide-angle end state to the telephoto end state.

EXAMPLE 5

Figure 25:
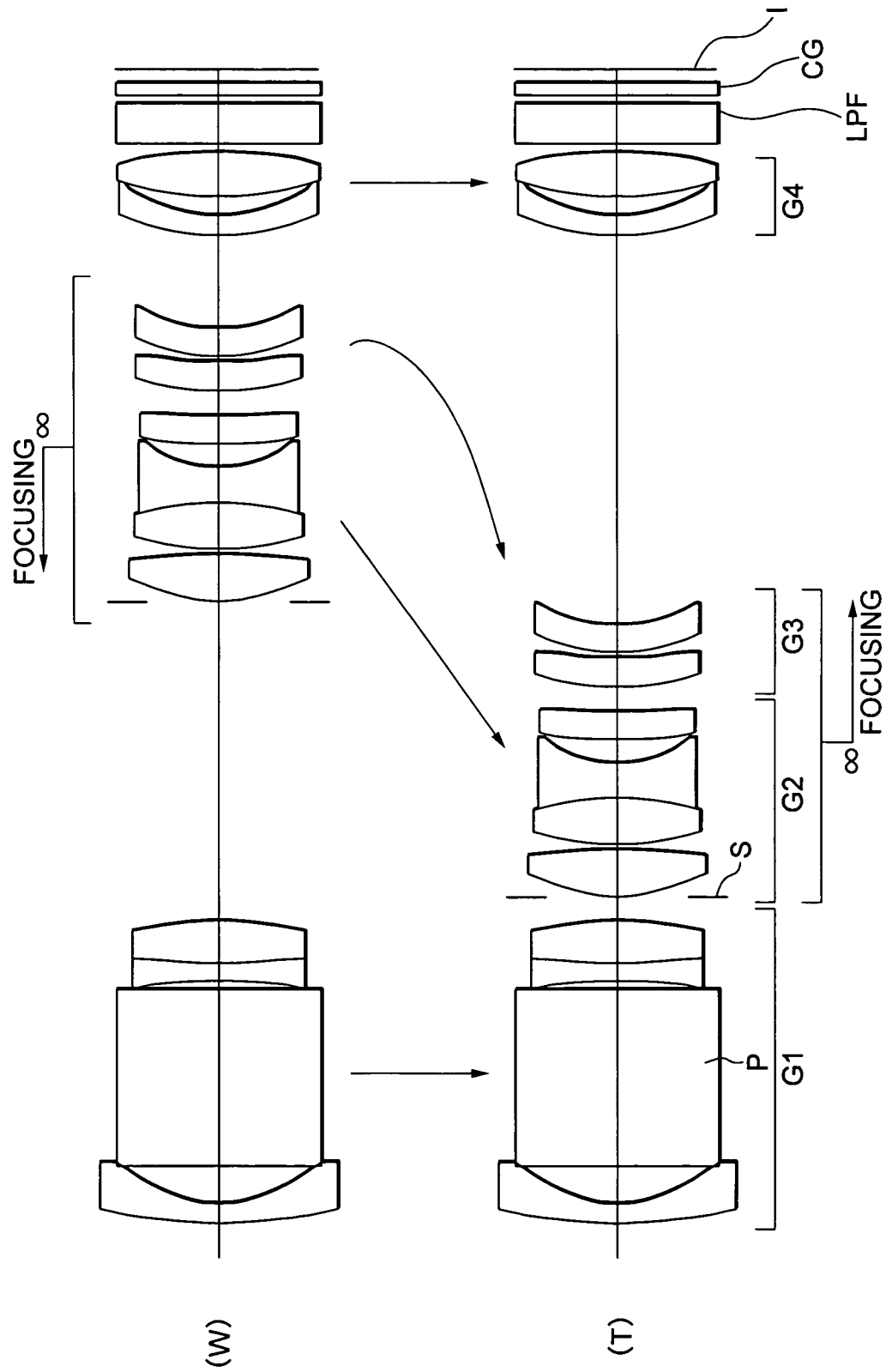
FIG. 25 is a diagram showing the lens arrangement of a zoom lens system according to Example 5 of the second embodiment of the present invention in which (W) shows the wide-angle end state, and (T) shows the telephoto end state.

FIG. 25 is a diagram showing the lens arrangement of a zoom lens system according to Example 5 of the second embodiment of the present invention in which (W) shows the wide-angle end state, and (T) shows the telephoto end state.

In FIG. 25, the zoom lens system according to Example 5 of a second embodiment is composed of, in order from an object, a first lens group G1 having negative refractive power, a second lens group G2 having positive refractive power, a third lens group G3 having positive refractive power, and a fourth lens group G4 having positive refractive power. The first lens group G1 and the fourth lens group G4 are always fixed upon zooming from the wide-angle end state W to the telephoto end state T and focusing. The second lens group G2 and the third lens group G3 are moved upon zooming from the wide-angle end state W to the telephoto end state T. The second lens group G2 and the third lens group G3 are moved respectively upon focusing from infinity (∞) to a close object. An optical low-pass filter LPF and a cover glass CG for a solid-state imaging device disposed on an image plane I are disposed between the fourth lens group G4 and the image plane I. Incidentally, a photographic film may be disposed on the image plane I instead of the imaging device. In this case, the cover glass CG is not necessary to be used.

A prism P for folding the optical path by substantially 90 degrees is included in the first lens group G1. The prism P is shown as a plane parallel plate extending the optical path to a straight line. The folding angle of the optical path is not necessary to be 90 degrees and is changeable in accordance with design. A mirror may be used instead of the prism P.

Respective aspherical surfaces are applied to the most image side lens surface of the first lens group G1 and the most object side lens surface of the second lens group G2. In this manner, the zoom lens system according to Example 5 of the second embodiment is constructed.

FIG. 31 is a diagram showing moving directions of the second lens group G2 and the third lens group G3 upon focusing from infinity (∞) to a close object in each focal length state of a zoom lens system according to each example of the second embodiment in which (W) denotes the wide-angle end state, (M) denotes the intermediate focal length state, and (W) denotes the telephoto end state.

As shown in FIG. 31, upon focusing from infinity (∞) to a close object, the second lens group G2 and the third lens group G3 are moved along the optical axis to the object in a body in the wide-angle end state, the second lens group G2 and the third lens group G3 are moved along the optical axis to the image side in a body in the telephoto end state, and the second lens group G2 is moved to the image and the third lens group G3 is moved to the object in the other focal length states (such as the intermediate focal length state M).

Various values associated with Example 5 are shown in Table 5.

TABLE 5

[Specifications]

| | W | M | T |
|---|---|---|---|
| f = | 5.943801 | 10.00000 | 16.83398 |
| Bf = | | 0.59168 (constant) | |
| FNO = | 2.81327 | 3.75683 | 5.08111 |
| ω = | 34.06642° | 20.46488° | 12.23899° |

[Lens Data]

| | r | d | ν | n |
|---|---|---|---|---|
| 1) | 21.9689 | 0.8000 | 40.77 | 1.883000 |
| 2) | 6.1015 | 1.6500 | | |
| 3) | 0.0000 | 7.5000 | 40.77 | 1.883000 |
| 4) | 0.0000 | 0.3000 | | |
| 5) | −25.0938 | 0.8000 | 40.77 | 1.883000 |
| 6) | 42.3960 | 1.8000 | 24.06 | 1.821140 |
| 7*) | −20.3866 | (D1) | | |
| 8> | 0.0000 | 0.0000 | | S |
| 9*) | 7.5092 | 2.0000 | 61.18 | 1.589130 |
| 10) | −25.9681 | 0.2000 | | |

TABLE 5-continued

| | | | | |
|---|---|---|---|---|
| 11) | 12.7999 | 2.0000 | 81.61 | 1.497000 |
| 12) | −12.7999 | 1.5000 | 36.26 | 1.620040 |
| 13) | 5.2389 | 1.0000 | | |
| 14) | 25.6840 | 1.2000 | 55.34 | 1.677900 |
| 15) | 417.9839 | (D2) | | |
| 16) | 10.6526 | 1.3000 | 81.61 | 1.497000 |
| 17) | 28.1536 | 0.2000 | | |
| 18) | 7.9033 | 1.2000 | 25.43 | 1.805180 |
| 19) | 6.3799 | (D3) | | |
| 20) | 9.8324 | 0.8000 | 53.03 | 1.648500 |
| 21) | 6.4986 | 0.8000 | | |
| 22) | 14.8580 | 1.9000 | 61.18 | 1.589130 |
| 23) | −18.3676 | 0.3000 | | |
| 24) | 0.0000 | 1.6600 | 70.51 | 1.544370 |
| 25) | 0.0000 | 0.4418 | | |
| 26) | 0.0000 | 0.5000 | 64.14 | 1.516330 |
| 27) | 0.0000 | (Bf) | | |

[Aspherical Data]

Surface Number 7

κ = −1.9459
C2 = 0.00000E−00
C4 = −1.55420E−04
C6 = −2.16590E−06
C8 = +2.64920E−08
C10 = 0.00000E−00

Surface Number 9

κ = +0.0245
C2 = 0.00000E−00
C4 = +6.41790E−06
C6 = −9.14700E−07
C8 = +4.90330E−08
C10 = +0.00000E−00

| | W | M | T |
|---|---|---|---|
| [Zooming Data] | | | |
| D1 | 13.74447 | 6.49447 | 0.99447 |
| D2 | 1.02696 | 6.56876 | 0.95876 |
| D3 | 3.97486 | 5.68306 | 16.79306 |
| [Focusing Data] shooting distance = 1.5 m | | | |
| D1 | 13.69492 | 6.57633 | 1.13386 |
| D2 | 1.02696 | 6.40504 | 0.95876 |
| D3 | 4.02442 | 5.76492 | 16.65367 |

[Values for Conditional Expressions]

nd1 = 1.80400
nd2 = 1.88300
f21/(−f22) = 0.801237

Figure 26A:
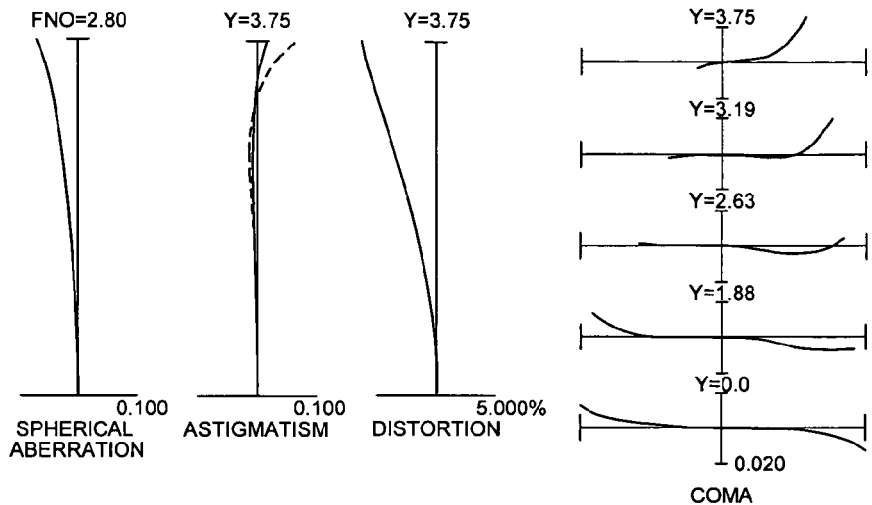
Figure 26B:
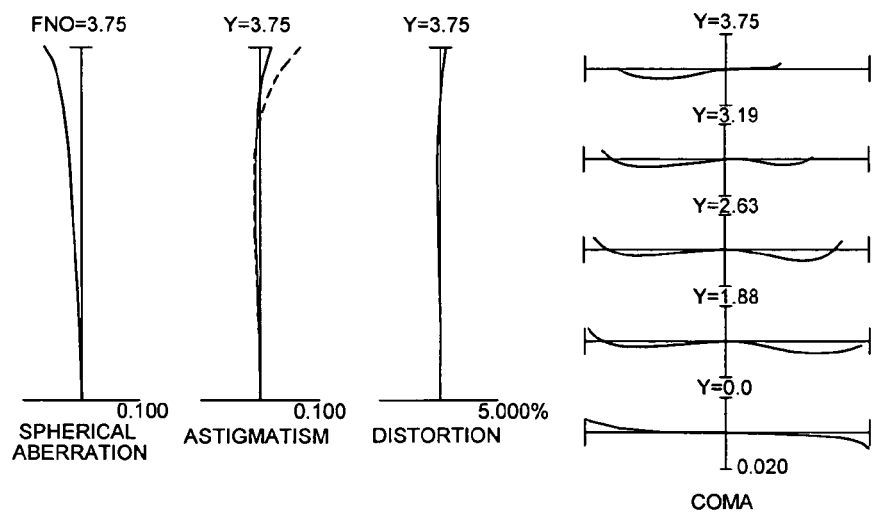
Figure 26C:
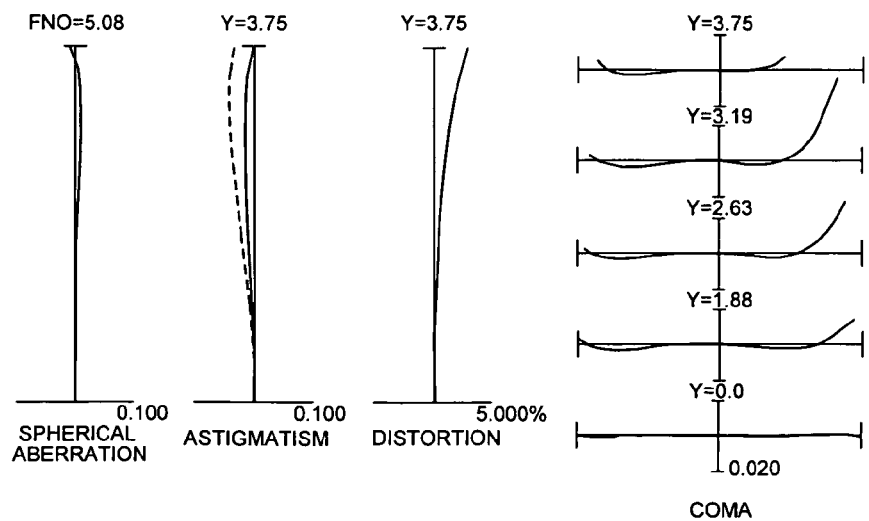

FIGS. 26A, 26B, and 26C are graphs showing various aberrations of the zoom lens system according to Example 5 upon focusing on infinity in which FIG. 26A shows the wide-angle end state, FIG. 26B shows the intermediate focal length state, and FIG. 26C shows the telephoto end state.

Figure 27A:
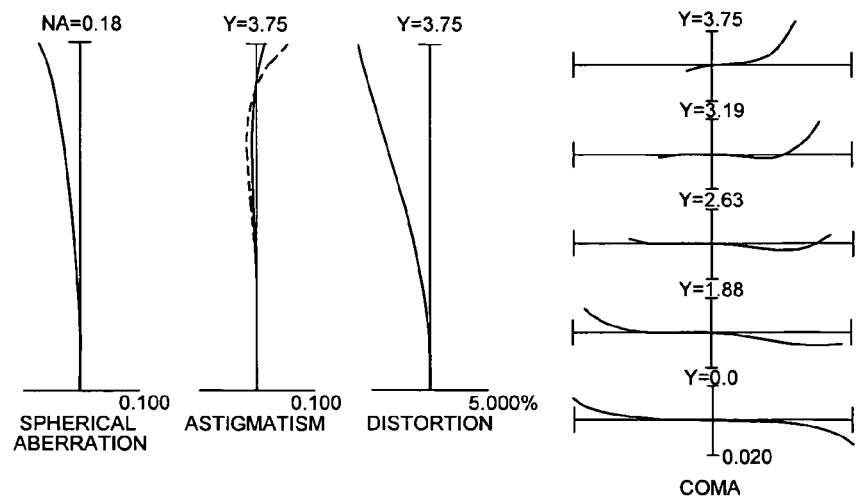
Figure 27B:
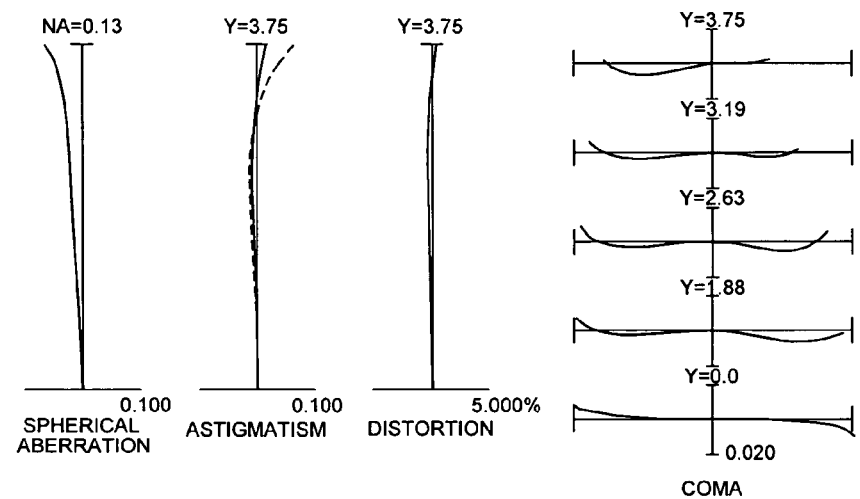
Figure 27C:
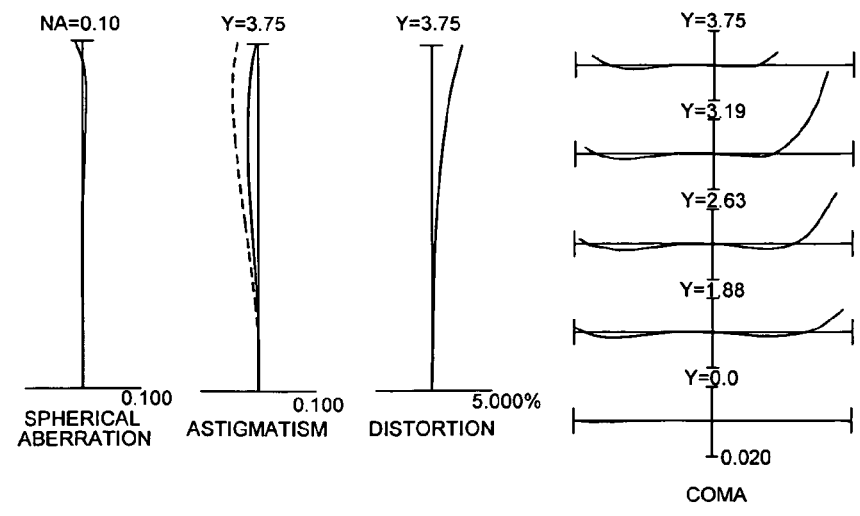

FIGS. 27A, 27B, and 27C are graphs showing various aberrations of the zoom lens system according to Example 5 upon focusing on a shooting distance of 1.5 m in which FIG. 27A shows the wide-angle end state, FIG. 27B shows the intermediate focal length state, and FIG. 27C shows the telephoto end state.

As is apparent from the respective graphs, the zoom lens system according to Example 5 shows superb optical performance as a result of good corrections to various aberrations in each focal length state from the wide-angle end state to the telephoto end state.

EXAMPLE 6

Figure 28:
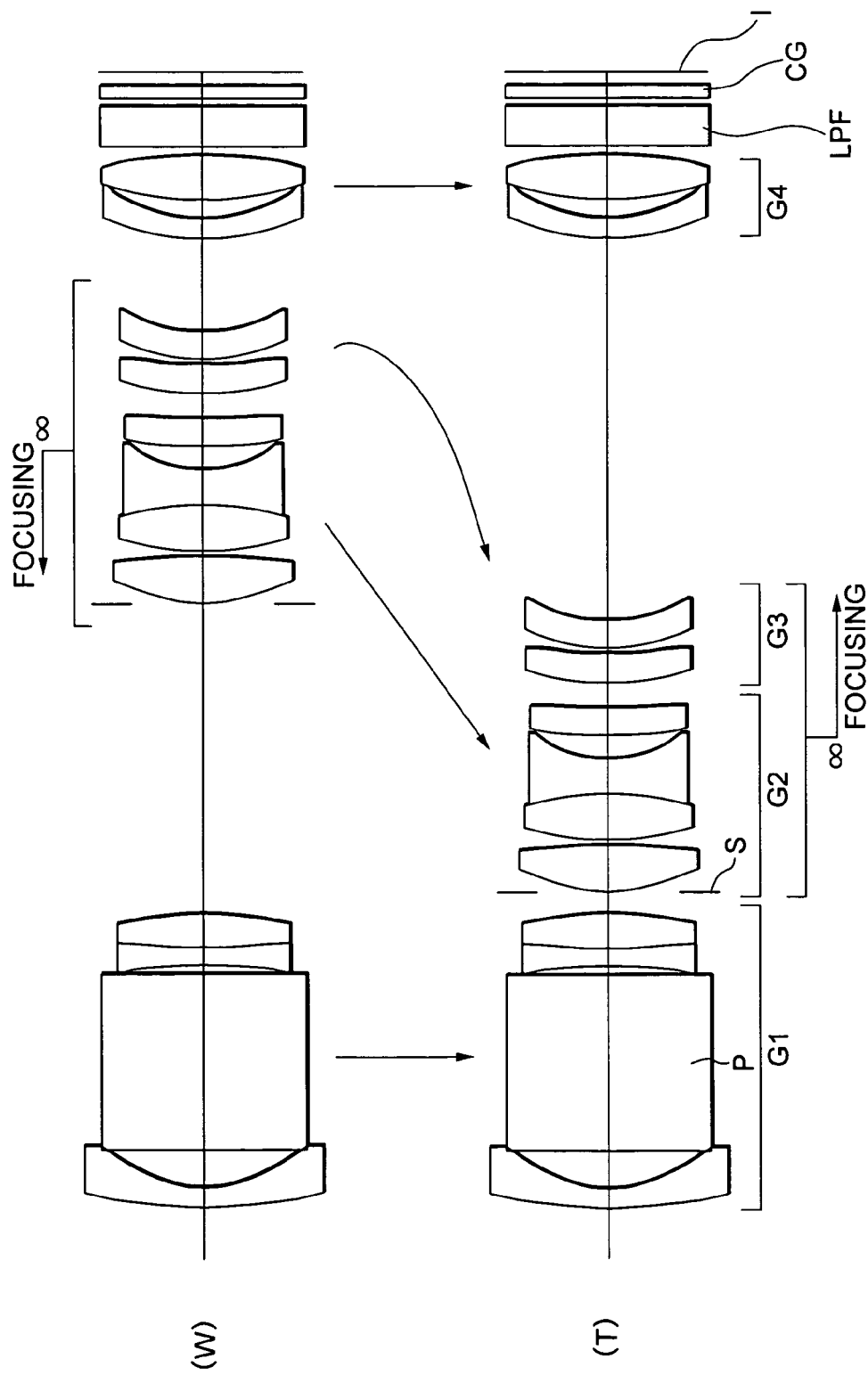
FIG. 28 is a diagram showing the lens arrangement of a zoom lens system according to Example 6 of the second embodiment of the present invention in which (W) shows the wide-angle end state, and (T) shows the telephoto end state.

FIG. 28 is a diagram showing the lens arrangement of a zoom lens system according to Example 6 of the second embodiment of the present invention in which (W) shows the wide-angle end state, and (T) shows the telephoto end state.

In FIG. 28, the zoom lens system according to Example 6 of a second embodiment is composed of, in order from an object, a first lens group G1 having negative refractive power, a second lens group G2 having positive refractive power, a third lens group G3 having positive refractive power, and a fourth lens group G4 having positive refractive power. The first lens group G1 and the fourth lens group G4 are always fixed upon zooming from a wide-angle end state W to a telephoto end state T and focusing. The second lens group G2 and the third lens group G3 are moved upon zooming from the wide-angle end state W to the telephoto end state T. The second lens group G2 and the third lens group G3 are moved respectively upon focusing from infinity (∞) to a close object. An optical low-pass filter LPF and a cover glass CG for a solid-state imaging device disposed on an image plane I are disposed between the fourth lens group G4 and the image plane I. Incidentally, a photographic film may be disposed on the image plane I instead of the imaging device. In this case, the cover glass CG is not necessary to be used.

A prism P for folding the optical path by substantially 90 degrees is included in the first lens group G1. The prism P is shown as a plane parallel plate extending the optical path to a straight line. The folding angle of the optical path is not necessary to be 90 degrees and is changeable in accordance with design. A mirror may be used instead of the prism P.

Respective aspherical surfaces are applied to the most image side lens surface of the first lens group G1 and the most object side lens surface of the second lens group G2. In this manner, the zoom lens system according to Example 6 of the second embodiment is constructed.

FIG. 31 is a diagram showing moving directions of the second lens group G2 and the third lens group G3 upon focusing from infinity (∞) to a close object in each focal length state of a zoom lens system according to each example of the second embodiment in which (W) denotes the wide-angle end state, (M) denotes the intermediate focal length state, and (W) denotes the telephoto end state.

As shown in FIG. 31, upon focusing from infinity (∞) to a close object, the second lens group G2 and the third lens group G3 are moved along the optical axis to the object in a body in the wide-angle end state, the second lens group G2 and the third lens group G3 are moved along the optical axis to the image side in a body in the telephoto end state, and the second lens group G2 is moved to the image and the third lens group G3 is moved to the object in the other focal length states (such as the intermediate focal length state M).

Various values associated with Example 6 are shown in Table 6.

TABLE 6

| [Specifications] | | | |
|---|---|---|---|
| | W | M | T |
| f = | 5.94310 | 9.99999 | 16.81000 |
| Bf = | | 0.60190 (constant) | |
| FNO = | 2.79763 | 3.72589 | 5.02097 |
| ω = | 34.02240° | 20.45894° | 12.22181° |

TABLE 6-continued

[Lens Data]

| | r | d | v | n |
|---|---|---|---|---|
| 1) | 23.0203 | 0.8000 | 0.77 | 1.883000 |
| 2) | 6.1243 | 1.6500 | | |
| 3) | 0.0000 | 7.5000 | 0.77 | 1.883000 |
| 4) | 0.0000 | 0.3000 | | |
| 5) | −26.2312 | 0.8000 | 0.77 | 1.883000 |
| 6) | 40.3324 | 1.4000 | 3.86 | 1.839170 |
| 7*) | −20.8793 | (D1) | | |
| 8> | 0.0000 | 0.0000 | Aperture Stop S | |
| 9*) | 7.5140 | 2.0000 | 1.24 | 1.589130 |
| 10) | −25.3463 | 0.2000 | | |
| 11) | 13.2531 | 1.9000 | 1.61 | 1.497000 |
| 12) | −12.8026 | 1.6000 | 6.26 | 1.620040 |
| 13) | 5.3204 | 1.0000 | | |
| 14) | 37.4661 | 1.2000 | 5.34 | 1.677900 |
| 15) | −95.8287 | (D2) | | |
| 16) | 10.2161 | 1.3000 | 1.61 | 1.497000 |
| 17) | 26.6800 | 0.2000 | | |
| 18) | 8.2222 | 1.2000 | 5.43 | 1.805180 |
| 19) | 6.5737 | (D3) | | |
| 20) | 10.2170 | 0.8000 | 3.03 | 1.648500 |
| 21) | 6.5000 | 0.8000 | | |
| 22) | 12.8369 | 1.8000 | 0.69 | 1.563840 |
| 23) | −19.0732 | 0.3000 | | |
| 24) | 0.0000 | 1.6600 | 0.51 | 1.544370 |
| 25) | 0.0000 | 0.5000 | | |
| 26) | 0.0000 | 0.5000 | 4.14 | 1.516330 |
| 27) | 0.0000 | (Bf) | | |

[Aspherical Data]

Surface Number 7

κ = 4.1968
C2 = 0.00000E−00
C4 = −6.91340E−05
C6 = −2.83040E−06
C8 = +8.07010E−08
C10 = 0.00000E−00

Surface Number 9

κ = 1.1999
C2 = 0.00000E−00
C4 = −3.43590E−04
C6 = −5.09820E−06
C8 = 0.00000E−00
C10 = 0.00000E−00

| | W | M | T |
|---|---|---|---|
| [Zooming Data] | | | |
| D1 | 13.85037 | 6.60079 | 1.09649 |
| D2 | 1.09937 | 6.59722 | 1.09937 |
| D3 | 3.98554 | 5.73728 | 16.73947 |
| [Focusing Data] shooting distance = 1.5 m | | | |
| D1 | 13.59376 | 6.60079 | 1.09649 |
| D2 | 1.35598 | 6.43498 | 0.76960 |
| D3 | 3.98554 | 5.89952 | 17.06924 |

[Values for Conditional Expressions]

nd1 = 1.88300
nd2 = 1.88300
f21/(−f22) = 0.79899

Figure 29A:
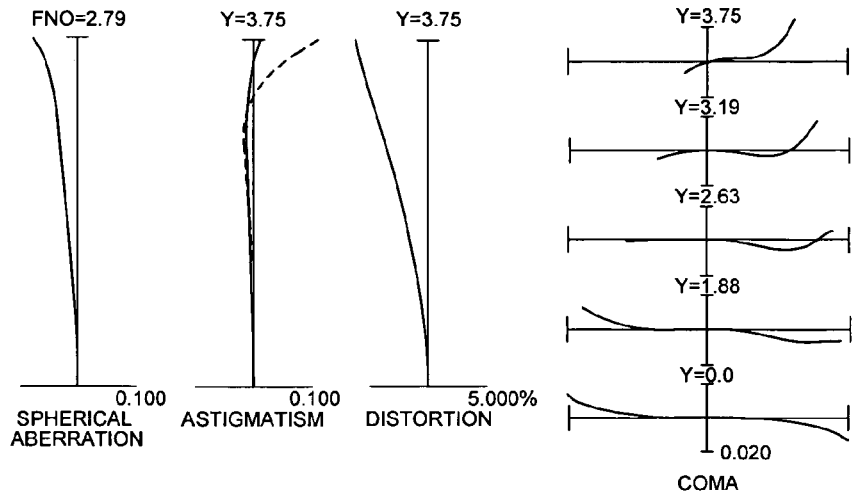
Figure 29B:
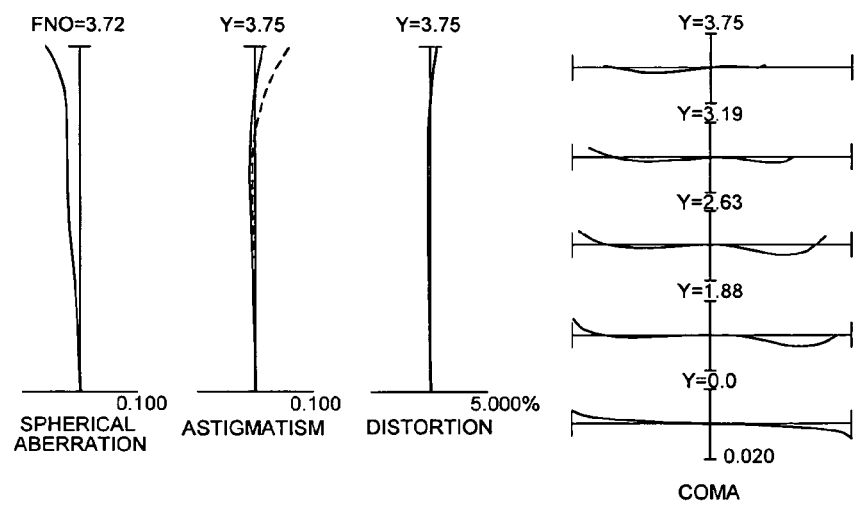
Figure 29C:
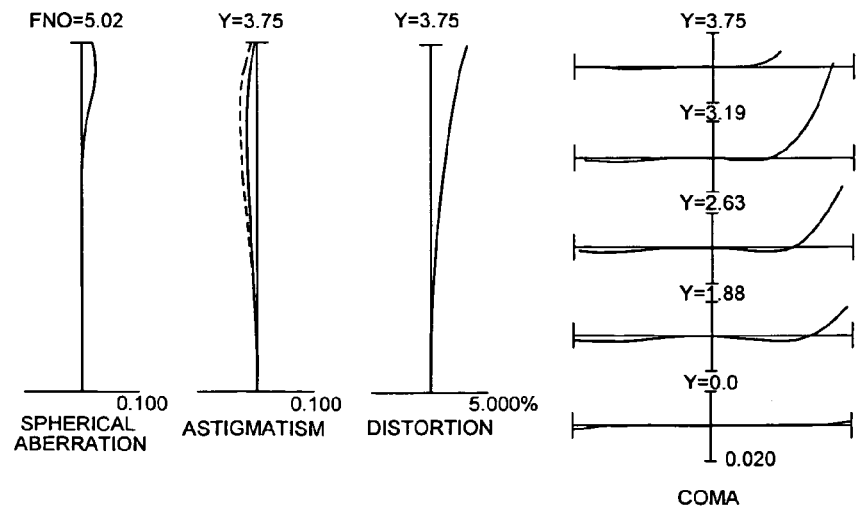

FIGS. 29A, 29B, and 29C are graphs showing various aberrations of the zoom lens system according to Example 6 upon focusing on infinity in which FIG. 29A shows the wide-angle end state, FIG. 29B shows the intermediate focal length state, and FIG. 29C shows the telephoto end state.

Figure 30A:
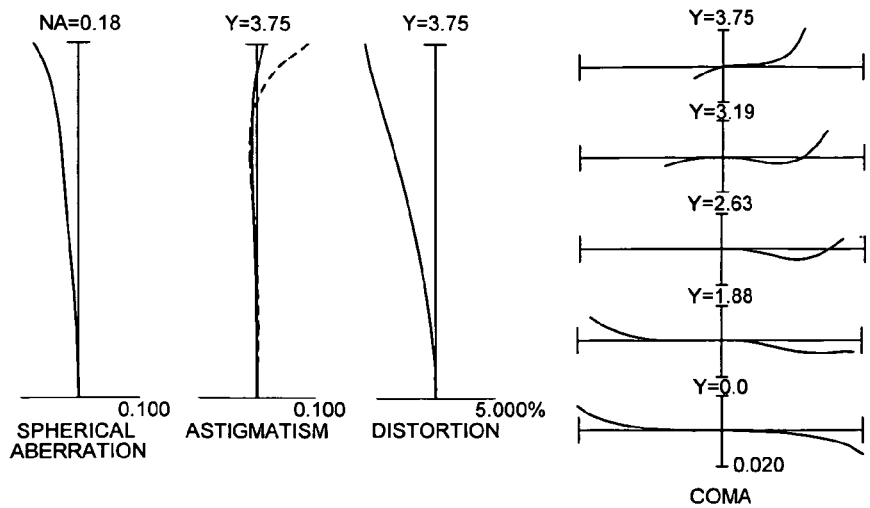
Figure 30B:
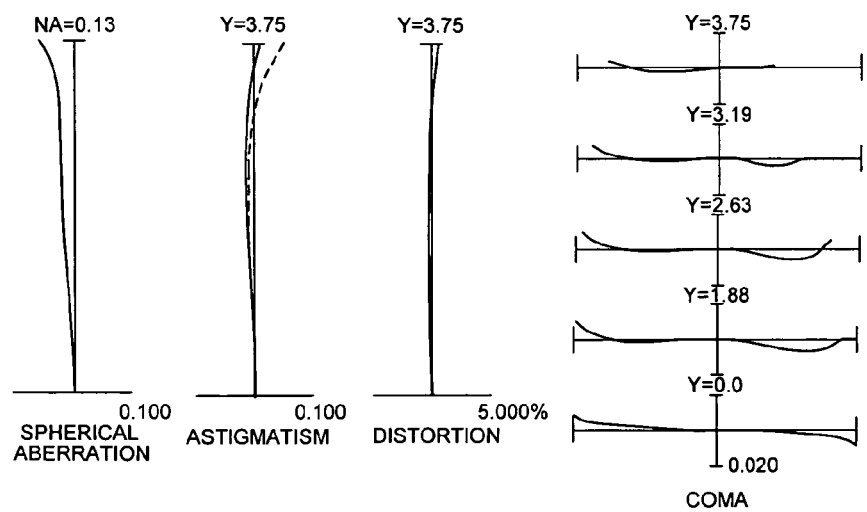
Figure 30C:
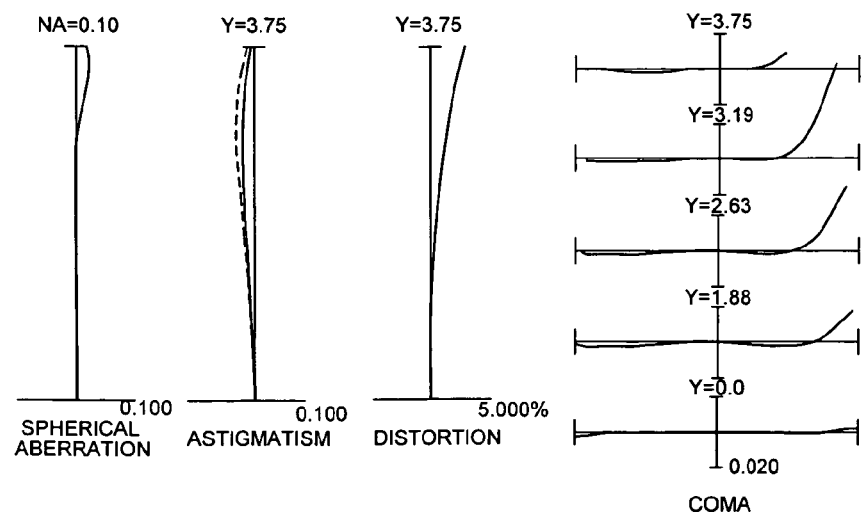

FIGS. 30A, 30B, and 30C are graphs showing various aberrations of the zoom lens system according to Example 6 upon focusing on a shooting distance of 1.5 m in which FIG. 30A shows the wide-angle end state, FIG. 30B shows the intermediate focal length state, and FIG. 30C shows the telephoto end state.

As is apparent from the respective graphs, the zoom lens system according to Example 6 shows superb optical performance as a result of good corrections to various aberrations in each focal length state from the wide-angle end state to the telephoto end state.

As described above, the present invention makes it possible to provide an ultra-compact zoom lens system having a zoom ratio of 2.5 or more with high optical performance, in consideration with using in a limited space for a zoom lens, suitable for a video camera and an electronic still camera using a solid-state imaging device.

In each Example, any surface of any lens group may be made a diffractive optical surface. In all lens groups, any lens element may be made a graded index lens (GRIN lens) or a plastic lens. In all lens groups, by shifting any lens group or a portion of any lens group perpendicularly to the optical axis or along a curve centered at a point, the zoom lens system can be made as a vibration reduction lens.

Incidentally, it is needless to say that although zoom lens systems with a four-lens-group configuration are shown as examples of the first embodiment of the present invention, a zoom lens system simply added by a lens group to a four-lens-group configuration is included in the spirit of the present invention. Moreover, in the configuration of each lens group, a lens group simply added by lens elements to the lens group shown in examples is included in the spirit or scope of the present invention.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object along an optical axis:
   a first lens group having negative refractive power;
   a second lens group having positive refractive power;
   a third lens group having positive refractive power; and
   at least one lens additional group having positive refractive power,
   the first lens group being always fixed upon zooming from a wide-angle end state to a telephoto end state and focusing,
   a plurality of lens groups not including the first lens group being moved respectively upon zooming from the wide-angle end state to the telephoto end state, and
   a plurality of lens groups not including the first lens group being moved respectively upon focusing.

2. The zoom lens system according to claim 1, wherein the following conditional expression is satisfied:

$$0.05 < f2/f3 < 0.50$$

where f2 denotes the focal length of the second lens group and f3 denotes the focal length of the third lens group.

3. The zoom lens system according to claim 2, wherein an optical-path-folding optics is disposed in the first lens group and the following conditional expressions are satisfied:

$$1.70 < nd1$$

$$nd1 = nd2$$

where nd1 denotes refractive index of the optical-path-folding optics, and nd2 denotes refractive index of a lens element disposed to the object side of the optical-path-folding optics.

4. The zoom lens system according to claim 3, wherein the most image side lens group is always fixed upon zooming from the wide-angle end state to the telephoto end state and focusing.

5. The zoom lens system according to claim 4, wherein an aperture stop is disposed to the most object side of the second lens group and moved together with the second lens group upon zooming.

6. The zoom lens system according to claim 1, including optical-path-folding optics disposed in the first lens group.

7. The zoom lens system according to claim 1, wherein the most image side lens group is always fixed upon zooming from the wide-angle end state to the telephoto end state and focusing.

8. The zoom lens system according to claim 1, wherein an aperture stop is disposed to the most object side of the second lens group and moved together with the second lens group upon zooming.

9. The zoom lens system according to claim 1, wherein the first lens group includes at least one aspherical surface.

10. The zoom lens system according to claim 1, wherein the second lens group includes at least one aspherical surface.

11. The zoom lens system according to claim 1, wherein the plurality of lens groups moved upon zooming from the wide-angle end state to the telephoto end state are the same lens groups moved upon focusing.

12. The zoom lens system according to claim 1, wherein a plurality of lens groups moved upon zooming from the wide-angle end state to the telephoto end state and focusing are only the second lens group and the third lens group.

13. The zoom lens system according to claim 1, wherein the following conditional expressions are satisfied:

$$1.70 < nd1$$

$$nd1 = nd2$$

where nd1 denotes refractive index of the optical-path-folding optics, and nd2 denotes refractive index of a lens element disposed to the object side of the optical-path-folding optics.

14. A zoom lens system comprising, in order from an object along an optical axis:
   a first lens group; and
   a plurality of lens groups,
   the first lens group being always fixed upon zooming from a wide-angle end state to a telephoto end state and focusing,
   the plurality of lens groups being moved respectively upon zooming from the wide-angle end state to the telephoto end state, and
   the plurality of lens groups being moved respectively upon focusing.

15. A method for forming an image of an object and varying a focal length, comprising:
   providing a zoom lens system that includes, in order from the object, a first lens group having negative refractive power, a second lens group having positive refractive power, a third lens group having positive refractive power, and at least one additional lens group having positive refractive power;
   varying the focal length from a wide-angle end state to a telephoto end state by moving a plurality of lens groups not including the first lens group, with the first lens group being fixed; and
   focusing by moving a plurality of lens groups not including the first lens group, with the first lens group being fixed.

16. The method according to claim 15, wherein the following conditional expression is satisfied:

$$0.05 < f2/f3 < 0.50$$

where f2 denotes the focal length of the second lens group, and f3 denotes the focal length of the third lens group.

17. The method according to claim 15, wherein the zoom lens system includes optical-path-folding optics disposed in the first lens group.

18. A method for forming an image of an object and varying a focal length, comprising:
   providing a zoom lens system that includes, in order from the object, a first lens group and a plurality of lens groups;
   varying the focal length from a wide-angle end state to a telephoto end state by moving a plurality of lens groups not including the first lens group, with the first lens group being fixed, and
   focusing by moving a plurality of lens groups not including the first lens group, with the first lens group being fixed.

* * * * *